United States Patent
Malladi

(10) Patent No.: US 9,078,223 B2
(45) Date of Patent: Jul. 7, 2015

(54) SUB-BAND DEPENDENT UPLINK LOAD MANAGEMENT

(75) Inventor: Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1041 days.

(21) Appl. No.: 12/444,493

(22) PCT Filed: Nov. 6, 2007

(86) PCT No.: PCT/US2007/083840
§ 371 (c)(1),
(2), (4) Date: Oct. 6, 2009

(87) PCT Pub. No.: WO2008/058162
PCT Pub. Date: May 15, 2008

(65) Prior Publication Data
US 2010/0093363 A1    Apr. 15, 2010

Related U.S. Application Data

(60) Provisional application No. 60/864,576, filed on Nov. 6, 2006.

(51) Int. Cl.
*H04W 52/34* (2009.01)
*H04B 17/345* (2015.01)

(52) U.S. Cl.
CPC ........... *H04W 52/343* (2013.01); *H04B 17/345* (2013.01)

(58) Field of Classification Search
None
See application file for complete search history.

(56) References Cited

U.S. PATENT DOCUMENTS

| 5,418,571 | A | 5/1995 | Ghanbari |
| 2005/0053036 | A1* | 3/2005 | Takeda .......................... 370/332 |
| 2006/0045001 | A1 | 3/2006 | Jalali |
| 2006/0083210 | A1* | 4/2006 | Li et al. ......................... 370/343 |

(Continued)

FOREIGN PATENT DOCUMENTS

| CN | 1507708 | 6/2004 |
| EP | 1180881 A1 | 2/2002 |

(Continued)

OTHER PUBLICATIONS

Translation of Office Action in Korean application 10-2009-7011775 corresponding to U.S. Appl. No. 12/444,493, citing KR20040004462 dated Jan. 18, 2011.

(Continued)

*Primary Examiner* — Ayaz Sheikh
*Assistant Examiner* — Sori Aga
(74) *Attorney, Agent, or Firm* — Peng Zhu

(57) ABSTRACT

A system and method for inter-cell interference mitigation in FDM systems is provided. The system provides for increased efficiency with load metric data generated per subband for both serving and neighboring non-serving cells. The system robustly provides for sharing load metric date per subband through a backhaul channel as well as directly from cell to adjacent cell. Furthermore, a UE based communication system allows UE reduction of assigned load controls based on directly reading a neighboring cells' load metrics. The system thus robustly handles various cell types (e.g. synchronous or asynchronous) and a variety of UE capabilities while providing increased efficiency in managing inter-cell interference.

30 Claims, 17 Drawing Sheets

(56) References Cited

U.S. PATENT DOCUMENTS

| | | |
|---|---|---|
| 2006/0094363 A1* | 5/2006 | Kang et al. .................. 455/63.1 |
| 2006/0166673 A1* | 7/2006 | Vasudevan .................. 455/439 |
| 2006/0234752 A1 | 10/2006 | Mese et al. |
| 2008/0081564 A1* | 4/2008 | Rao ............................. 455/63.1 |

FOREIGN PATENT DOCUMENTS

| | | | |
|---|---|---|---|
| JP | 2003087171 A | 3/2003 | |
| KR | 20040004462 | 1/2004 | |
| RU | 2120702 C1 | 10/1998 | |
| WO | 01076098 | 10/2001 | |
| WO | WO 02/49305 * | 6/2002 | ............. H04L 27/26 |
| WO | WO0249305 A2 | 6/2002 | |
| WO | 02073831 A1 | 9/2002 | |
| WO | 02099978 | 12/2002 | |
| WO | 2005046283 | 5/2005 | |
| WO | 06004968 | 1/2006 | |
| WO | WO2006007527 | 1/2006 | |
| WO | 06038786 | 4/2006 | |
| WO | 2006086788 A1 | 8/2006 | |
| WO | 06099547 | 9/2006 | |
| WO | 2008058109 | 5/2008 | |

OTHER PUBLICATIONS

Translation of Office Action in Russian application 2009121550 corresponding to U.S. Appl. No. 12/444,493, citing WO0176098A2, WO2006004968A2, WO06038786, WO2006099547A1, WO02099978A2, US20060234752, RU2120702, WO2006007527 and US20060045001 dated Mar. 17, 2011.
International Search Report—PCT/US2007/083840, International Search Authority—European Patent Office, Oct. 13, 2008.
Written Opinion—PCT/US2007/083840, International Search Authority—European Patent Office, Oct. 13, 2008.
Partial International Search Report—PCT/US2007/083840, Interntaional Search Authority—European Patent Office—May 20, 2008.

* cited by examiner

Robust UE Based Inter-cell Interference Mitigation Method
in Synchronous or Asynchronous Orthogonal Systems

SUB-BAND DEPENDENT UPLINK LOAD MANAGEMENT

CROSS-REFERENCE TO RELATED APPLICATIONS

This application claims the benefit of U.S. Provisional Patent application Ser. No. 60/864,576 entitled "UPLINK INTER-CELL INTERFERENCE MANAGEMENT" which was filed Nov. 6, 2006. The entirety of the aforementioned application is herein incorporated by reference.

BACKGROUND

I. Field

The following description relates generally to wireless communications, and more particularly to inter-cell interference management in a wireless communication system.

II. Background

A typical wireless communication network (e.g., employing frequency, time and code division techniques) includes one or more base stations that provide a coverage area and one or more mobile (e.g., wireless) terminals that can transmit and receive data within the coverage area. A typical base station can concurrently transmit multiple data streams for broadcast, multicast, and/or unicast services, wherein a data stream is a stream of data that can be of independent reception interest to a mobile terminal. A mobile terminal within coverage area of the base station can be interested in receiving one, more than one, or all data streams carried by the composite stream. Likewise, a mobile terminal can transmit data to the base station, other stations or other mobile terminals. Each terminal communicates with one or more base stations via transmissions on forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple-out (MIMO) system.

Conventional technologies utilized for transmitting information within a mobile communication network (e.g., a cell phone network) include frequency, time and code division based techniques. In general, with frequency division based techniques calls are split based on a frequency access method, wherein respective calls are placed on a separate frequency. With time division based techniques, respective calls are assigned a certain portion of time on a designated frequency. With code division based techniques respective calls are associated with unique codes and spread over available frequencies. Respective technologies can accommodate multiple accesses by one or more users.

With time division based techniques, a band is split time-wise into sequential time slices or time slots. Each user of a channel is provided with a time slice for transmitting and receiving information in a round-robin manner. For example, at any given time t, a user is provided access to the channel for a short burst. Then, access switches to another user who is provided with a short burst of time for transmitting and receiving information. The cycle of "taking turns" continues, and eventually each user is provided with multiple transmission and reception bursts.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

More particularly, frequency division based techniques typically separate the spectrum into distinct channels by splitting it into uniform chunks of bandwidth, for example, division of the frequency band allocated for wireless cellular telephone communication can be split into 30 channels, each of which can carry a voice conversation or, with digital service, carry digital data. Each channel can be assigned to only one user at a time.

One commonly utilized variant is an orthogonal frequency division technique that effectively partitions the overall system bandwidth into multiple orthogonal subbands. Orthogonal meaning that the frequencies are chosen so that cross-talk between the sub-channels is eliminated and inter-carrier guard bands are not required. These subbands are also referred to as tones, carriers, subcarriers, bins, and frequency channels. Each sub-carrier is modulated with a conventional modulation scheme (such as quadrature amplitude modulation) at a low symbol rate. Orthogonal frequency division has an advantageous ability to cope with severe channel conditions—for example, attenuation of high frequencies at a long copper wire, narrowband interference and frequency-selective fading due to multipath—without complex equalization filters. Low symbol rate makes the use of a guard interval between symbols affordable, making it possible to handle time-spreading and eliminate inter-symbol interference (ISI).

The orthogonality also allows high spectral efficiency, near the Nyquist rate. Almost the whole available frequency band can be utilized. OFDM generally has a nearly 'white' spectrum, giving it benign electromagnetic interference properties with respect to other co-channel users, and allowing higher transmit power when a single cell is considered alone. Also, without interior-carrier guard bands, the design of both the transmitter and the receiver is greatly simplified; unlike conventional FDM, a separate filter for each sub-channel is not required.

Orthogonality is often paired with frequency reuse, where communications taking place in cells located far apart may use the same portion of the spectrum, and ideally the large distance prevents interference. Cell communications taking place in nearby cells use different channels to minimize the chances of interference. Over a large pattern of cells, a frequency spectrum is reused as much as possible by distributing common channels over the entire pattern so that only far apart cells reuse the same spectrum. In such a case, and when scheduler flexibility to allocate bandwidth to different users is introduced, inter-cell interference control becomes critical.

With OFDM intra-cell interference is effectively contained. The roadblock to greater system efficiency becomes inter-cell interference. Methods to improve management of inter-cell interference, and at the same time be robust enough to handle various cell varieties (e.g., synchronous and asynchronous) and support a variety of user devices or end nodes (e.g., expensive, feature laden as well as economical, basic use), requires consideration in the wireless communications arena.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In an aspect, a method to mitigate inter-cell interference gains granularity and increased efficiency by dividing communications bandwidth into multiple subbands and providing a load indicator per subband. The load per subband information is provided as binary load indicator data and is provided for both a serving cell and broadcast to neighboring cells. A user equipment (UE) has access to both the serving cell and non-serving neighbor cell's load indicator data on a per subband basis, which provides for a level of granularity that allows for more complete use of the bandwidth, and more UE's can operate at load within a given bandwidth.

In another aspect a method to control and reduce inter-cell interference through UE based load management is disclosed. The method robustly handles multiple cells that operate either synchronously or asynchronously, and allows an individual UE capability to be a factor in optimizing the reduction of inter-cell interference. When a UE is started, it typically receives a message front the serving cell access node indicating the type of serving cell operation synchronous or asynchronous). The type of operation can force the UE to follow one method or another in reducing inter-cell interference. The current method allows the UE to seek the best method of inter-cell interference reduction that may not be dependent on the serving cell's mode of operation. In one non-limiting example, a UE may be operating in a asynchronous cell but have the capability of accessing a neighbor cell's load data directly. In this case, the UE may operate to reduce or maintain its transmitting power spectral density depending on a faster direct neighbor cell binary load per subband information rather than waiting for the neighbor cell binary load per subband information that may arrive through a backhaul channel of the serving cell.

In an aspect, a method to mitigate inter-cell interference gains granularity and increased efficiency by dividing communications bandwidth into multiple subbands and providing a load metric corresponding to observed load per subband. The load metric can be provided for both to user equipment (UE) and broadcast to neighboring cells. The serving cell can also receive load metrics per subband from adjacent cells through a backhaul channel, and provide this to UEs. User equipment can also have access of load metrics on a per subband basis directly from adjacent cells.

In another aspect a method for UE based communication system is disclosed. The UE receives adjacent cell load metric information on a subband basis. The UE determines the source of the load metric information. If the information is directly from an adjacent cell (e.g. the information flow through he backhaul is not available), the UE determines if the assigned subband is loaded in the adjacent cell metrics, and if so can then reduce its transmit power spectral density. If the metric indicates an unloaded condition, the UE maintains the assigned subband transmit power spectral density. If the source of the load metric information is not the adjacent cell, the UE maintains the assigned transmit power spectral density as dictated by the serving cell.

In an aspect, a method that facilitates inter-cell interference mitigation, comprises: dividing a cell bandwidth into N sub-bands, where N is an integer>2; assigning the respective sub-bands to respective user equipment (UEs); tracking sub-band assignments; and broadcasting sub-band assignments to neighboring cells.

In another aspect, a computer readable storage medium has stored thereon computer readable instructions for performing acts comprising: dividing a cell bandwidth into N subbands, where N is an integer>2; assigning the respective sub-bands to respective user equipment (UEs); tracking sub-band assignments; and broadcast sub-band assignments to neighboring cells.

In yet another aspect, an apparatus, comprise: a storage medium, comprising computer executable instructions stored thereon for carrying out the following acts: dividing a cell bandwidth into N subbands, where N is an integer>2; assigning the respective sub-bands to respective user equipment (UEs); tracking sub-band assignments; and broadcasting sub-band assignments to neighboring cells. A processor executes the computer executable instructions.

In an aspect, a system that facilitates inter-cell interference mitigation, comprises: means for dividing a cell bandwidth into N subbands, where N is an integer>2; means for assigning the respective sub-bands to respective user equipment (UEs); means for tracking sub-band assignments; and means for broadcasting sub-band assignments to neighboring cells.

In another aspect, a method that facilitates inter-cell interference mitigation, comprises: receiving an assigned sub-band; identifying capabilities of a user equipment (UE); if the UE meets a capability threshold, look at neighboring cells for conflicting sub-band load indicator data; if a conflict exists, reduce UE power; and if a conflict does not exist, maintain UE power.

In yet another aspect, a computer readable storage medium has stored thereon computer readable instructions for performing acts comprising: receiving an assigned sub-band; identifying capabilities of a user equipment (UE); if the UE meets a capability threshold, look at neighboring cells for conflicting sub-band load indicator data; if a conflict exists, reduce UE power; and if a conflict does not exist, maintain UE power.

In still yet another aspect, an apparatus, comprises: a storage medium, comprising computer executable instructions stored thereon for carrying out the following acts: receiving an assigned sub-band; identifying capabilities of a user equipment (UE); if the UE meets a capability threshold, look at neighboring cells for conflicting sub-band load indicator data; if a conflict exists, reduce UE power; and if a conflict does not exist, maintain UE power. A processor executes the computer executable instructions.

In an aspect, a method that facilitates inter-cell interference mitigation, comprises: dividing a cell bandwidth into a plurality of subbands, and providing a load metric corresponding to the observed load per subband to neighboring cells. The load metric can also be broadcast to UEs.

In another aspect, a computer readable storage medium has stored thereon computer readable instructions for performing acts comprising: dividing a cell bandwidth into a plurality of subbands, and providing a load metric corresponding to the observed load per subband to neighboring cells. The computer readable storage medium also has stored thereon computer readable instructions for broadcasting load metrics.

In an aspect, a processor executes code to perform acts comprising: dividing a cell bandwidth into a plurality of subbands, and providing a load metric corresponding to the observed load per subband to neighboring cells. The processor executes code to broadcast load metrics.

In yet another aspect, an apparatus, comprises: a storage medium, comprising computer executable instructions stored thereon for carrying out the following acts: dividing a cell bandwidth into a plurality of subbands, and providing a load metric corresponding to the observed load per subband to neighboring cells. Computer executable instructions for broadcasting load metrics per subband to UEs can be comprised on the storage medium. A processor executes the computer executable instructions.

In still yet another aspect, a system that facilitates inter-cell interference mitigation, comprises: means for dividing a cell bandwidth into a plurality of subbands, and means for providing a load metric corresponding to the observed load per subband to neighboring cells, as well as means for broadcasting load metrics per subband.

In an aspect, a method for UE based communication system that facilitates inter-cell interference mitigation, comprises: receiving adjacent cell load metric per subband; determining if the adjacent cell load metric per subband has been received from the serving cell or from an adjacent cell and determining if the assigned subband is loaded in the adjacent cell. If the adjacent cell does provide the load metric and the load metric indicates that the assigned subband is indeed loaded, the assigned transmit power spectral density is reduced. If the assigned subband is not loaded, or if the source of the adjacent cell load metric is the serving cell, the assigned transmit power spectral density is maintained.

In yet another aspect, a computer readable storage medium has stored thereon computer readable instructions for performing acts comprising: receiving adjacent cell load metric per subband; determining if the adjacent cell load metric per subband has been received from the serving cell or from an adjacent cell and determining if the assigned subband is loaded in the adjacent cell, reducing the assigned transmit power spectral density if the adjacent cell does provide the load metric and the load metric indicates that the assigned subband is indeed loaded, and maintaining the assigned transmit power spectral density if the assigned subband is not loaded, or if the source of the adjacent cell load metric is the serving cell.

In an aspect, a processor executes code to perform acts comprising: receiving adjacent cell load metric per subband; determining if the adjacent cell load metric per subband has been received from the serving cell or from an adjacent cell and determining if the assigned subband is loaded in the adjacent cell, reducing the assigned transmit power spectral density if the adjacent cell does provide the load metric and the load metric indicates that the assigned subband is indeed loaded, and maintaining the assigned transmit power spectral density if the assigned subband is not loaded, or if the source of the adjacent cell load metric is the serving cell.

In still yet another aspect, an apparatus, comprises: a storage medium, comprising computer executable instructions stored thereon for carrying out the following acts: receiving adjacent cell load metric per subband; determining if the adjacent cell load metric per subband has been received from the serving cell or from an adjacent cell and determining if the assigned subband is loaded in the adjacent cell, reducing the assigned transmit power spectral density if the adjacent cell does provide the load metric and the load metric indicates that the assigned subband is indeed loaded, and maintaining the assigned transmit power spectral density if the assigned subband is not loaded, or if the source of the adjacent cell load metric is the serving cell. A processor executes the computer executable instructions.

In still yet another aspect, a system for UE based communication system comprises: means for receiving adjacent cell load metric per subband; means for determining if the adjacent cell load metric per subband has been received from the serving cell or from an adjacent cell and means for determining if the assigned subband is loaded in the adjacent cell, means for reducing the assigned transmit power spectral density if the adjacent cell does provide the load metric and the load metric indicates that the assigned subband is indeed loaded, and means for maintaining the assigned transmit power spectral density if the assigned subband is not loaded, or if the source of the adjacent cell load metric is the serving cell.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
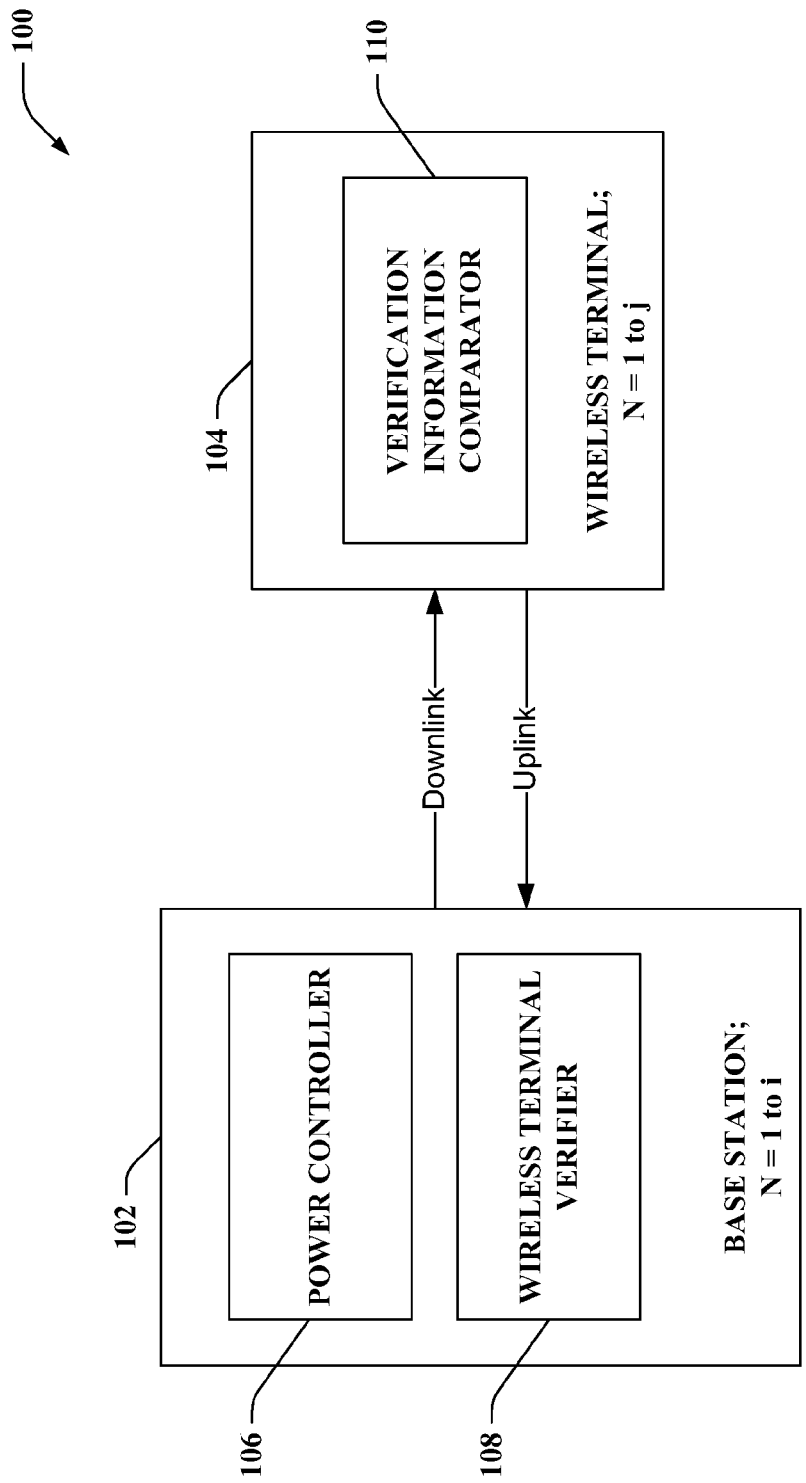
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident however, that such embodiment(s) may be practiced without these specific details. In other instances, well-known structures and devices are shown in block diagram form in order to facilitate describing one or more embodiments. As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an integrated circuit, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Various embodiments will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The word "exemplary" is used herein to mean "serving as an example, instance, or illustration." Any embodiment or design described herein as "exemplary" is not necessarily to be construed as preferred or advantageous over other embodiments or designs. The word "listening" is used herein to mean that a recipient device (access point or access terminal) is receiving and processing data received on a given channel.

Various aspects can incorporate inference schemes and/or techniques in connection with transitioning communication resources. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events, or decision theoretic, building upon probabilistic inference, and considering display actions of highest expected utility, in the context of uncertainty in user goals and intentions. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, various aspects are described herein in connection with a subscriber station. A subscriber station can also be called a system, a subscriber unit, mobile station, mobile, remote station, access point, remote terminal, access terminal, user terminal, user agent, a user device, mobile device, portable communications device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 can comprise a base station 102 that receives, transmits, repeats, etc., wireless communication signals to a wireless terminal 104. Further, it is contemplated that system 100 may include a plurality of base stations similar to base station 102 and/or a plurality of wireless terminals similar to wireless terminal 104. Base station 102 can comprise a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art. Base station 102 may be a fixed station and/or mobile. Wireless terminal 104 can be, for example, a cellular phone, a smart phone, a laptop, a handheld communication device, a handheld computing device, a satellite radio, a global positioning system, a PDA, and/or any other suitable device for communicating over wireless communication system 100. Also, wireless terminal 104 may be fixed or mobile.

Wireless terminal 104 may communicate with base station 102 (and/or disparate base station(s)) on a downlink and/or an uplink channel at any given moment. The downlink refers to the communication link from base station 102 to wireless terminal 104, and the uplink channel refers to the communication link from wireless terminal 104 to base station 102. Base station 102 may further communicate with other base station(s) and/or any disparate devices (e.g., servers) (not shown) that may perform functions such as, for example, authentication and authorization of wireless terminal 104, accounting, billing, and so on.

Base station 102 may further include a power controller 106 and a wireless terminal verifier 108. Power controller 106 may measure a power level associated with wireless terminal 104 (and/or any disparate wireless terminals). Further, power controller 106 may transmit power commands to wireless terminal 104 to facilitate adjusting the power level. For instance, power controller 106 may transmit a power command in one or more transmission units associated with a first subset of transmission units. The power commands, for instance, may indicate to increase a power level, decrease a power level, remain at a power level, and the like. Upon receipt of power commands to increase or decrease power, wireless terminal 104 may alter an associated power level a fixed (e.g., preset) and/or variable amount. The preset amounts may be of variable size based on certain factors (e.g., frequency reuse factors, channel conditions at different mobile stations). Further, wireless terminal verifier 108 may transmit information as a function of a terminal identifier related to a wireless terminal (e.g., wireless terminal 104) in one or more transmission units associated with a second subset of transmission units. Moreover, one or more ON identifiers may be assigned to each wireless terminal when in session ON state and the ON identifiers may be associated with the first subset and second subset of transmission units. Transmission units may be in variable formats (e.g., time domain, frequency domain, hybrid of both time and frequency domains).

Power controller 106 may transmit power commands over a downlink power control channel (DLPCCH). Pursuant to an example, resources may be assigned to wireless terminal 104 by base station 102 as wireless terminal 104 accesses a session ON state; such resources may include particular DLPCCH segments, one or more ON identifiers, etc. The DLPCCH may be utilized by a base station sector attachment point (e.g., employing power controller 106) to transmit downlink power control messages to control transmission power of wireless terminal 104.

Wireless terminal verifier 108 may transmit information associated with a wireless terminal (e.g., wireless terminal 104) to which the power commands correspond along with the power commands transferred by power controller 106. For example, wireless terminal verifier 108 may transmit information as a function of a terminal identifier (e.g., scrambling mask) associated with the wireless terminal (e.g., wireless terminal 104). Wireless terminal verifier 108 may transfer such information over the DLPCCH. Pursuant to an illustration, information associated with wireless terminal 104 may be transmitted over the DLPCCH with a subset of the power command transmissions from power controller 106.

Wireless terminal 104 may further include a verification information comparator 110 that evaluates the received information associated with wireless terminal 104. Verification information comparator 110 may analyze the received information to determine whether wireless terminal 104 is utilizing resources as set forth by base station 102; thus, verification information comparator 110 may evaluate information included in the Q component of symbols transmitted over the DLPCCH. For instance, base station 102 may have assigned identifier(s) (e.g., session ON ID) to wireless terminal 104, and verification information comparator 110 may analyze whether wireless terminal 104 employs appropriate resources associated with the assigned identifier(s). According to other examples, verification information comparator 110 may determine whether wireless terminal 104 is utilizing segments of the DLPCCH allocated by base station 102 and/or whether base station 102 has reclaimed resources (e.g., session ON ID) previously assigned to wireless terminal 104.

It is to be appreciated that the base station 102 or wireless terminal 110, given respective state, can serve as user equipment (UE). For uplink communications, it is desirable to control reverse link load. Conventionally, a single control is typically employed for time-frequency bands; however, doing so results in a relatively inflexible framework. By dividing a communications band into several sub-bands increased flexibility is achieved as to conventional schemes—this affords for increased control granularity by having different control thresholds over respective sub-bands as well as allowing for distinct control per sub-band. The increase in control provides for using sub-bands for different purposes, and more efficient usage of reverse up-link resources as compared to conventional schemes. Market forces have moved the industry toward simple communications protocols in an attempt to optimize system performance. The aspects described and claimed herein run counter to conventional wisdom and market forces by increasing processing overhead via utilization of multiple sub-bands and control thereof. However, as a result of enduring such perceived processing load, overall system performance optimization is facilitated as a result of the flexibility afforded by more granular control of sub-bands and increased utilization of system resources. For example, in conventional systems with single control every user within a given cell can increase power which can result in interference to neighboring cells. In response, UEs in neighboring cells would likely respond by increasing their power to overcome the interference which in turn would cause interference in the other cell. Consequently, such convergence toward power boosting compounds interference created.

More particularly, interference management in orthogonal systems is facilitated by identifying and mitigating interference caused by neighboring cells. Communications bandwidth is divided into multiple subbands, and load indicator(s) are provided per subband. As noted supra, doing so mitigates inter-cell interference, improves control granularity, and facilitates overall utilization of system resources. The load per subband information is provided as binary load indicator data and is provided for both a serving cell and broadcast to neighboring cells. The user equipment (UE) has access to both the serving cell and non-serving neighbor cell's load indicator data on a per subband basis, which provides for a level of granularity that allows for more complete use of the bandwidth, and more UE's can operate at load within a given bandwidth.

UE based load management can be handled across multiple cells that operate either synchronously or asynchronously. This allows an individual UE capability to be a factor in optimizing the reduction of inter-cell interference. When a UE is started, it typically receives a message from the serving cell access node indicating type of serving cell operation (e.g., synchronous or asynchronous). The type of operation can force the UE to follow one method or another in reducing inter-cell interference. The current method allows the UE to seek a best method of inter-cell interference reduction that may not be dependent on the serving cell's mode of operation. In one non-limiting example, an UE may be operating in a asynchronous cell but have the capability of accessing a neighbor cell's load data directly. In this case, the UE may operate to reduce or maintain its transmitting power spectral density depending on a faster direct neighbor cell binary load per subband information rather than waiting for the neighbor cell binary load per subband information that may arrive through a backhaul channel of the serving cell.

In orthogonal cellular systems, inter-cell interference needs to be mitigated to ensure cell-edge quality of service (QoS). Different systems employ different forms of techniques, but in essence there are two schools of thought. In a network based solution, each cell controls the transmit power spectral density (Tx PSD) of each UE based on its neighbor cell signal to noise ratio (SNR) measurements—this is similar to general packet radio service (GPRS). In a UE based solution, each UE controls its own Tx PSD based on neighbor cell SNR. Furthermore, in the UE based solution there are two aspects. In a neighbor cell based aspect, each UE monitors an uplink load indicator transmitted by a subset of the neighbor cells that it detects—similar to high-speed uplink packet access (HSUPA), LTE, and DOrC. In a serving cell aspect, the serving cell broadcasts uplink load of the geographical neighbor cells (e.g., used in flash). Aspects described herein employ a UE based uplink load management scheme that combines the above two solutions appropriately.

In the UE based approach, there are pros and cons of each solution. In the neighbor cell based aspect, the UE can detect neighbor cell load quickly. However, in asynchronous systems, the UE needs to maintain multiple fast fourier transform (FFT) timings, one for each neighbor cell detected—this can be a con. In the serving cell based aspect, the UE does not need to maintain any neighbor cell timing—this is advantageous. However, load information needs to propagate through a backhaul (con).

A hybrid approach (e.g., combining various features) results in improved performance. To combine, each cell broadcasts both parameters: uplink inter-cell interference seen at the receiver (Rx). A binary valued load indicator is employed per subband, and this indicates whether the respective cell is loaded on a particular subband or not. A subband is smaller than or equal to the total system bandwidth (e.g., 20 MHz system with 20 subbands of 900 KHz each and a spanned bandwidth of 18 MHz). The transmission is done on a primary broadcast channel (BCH). Regarding neighbor cell load, loading is done from geographically close cells, and load is indicated per subband.

With respect to UE behavior, the UE reduces Tx PSD depending on detected neighbor cell load. Detection is based on either of two approaches: (1) decoded load indicator transmitted from neighbor cell; and (2) decoded neighbor cell load information transmitted from serving cell. In synchronous systems, the UE relies on load indicators transmitted from neighbor cell. In asynchronous systems, the UE relies on neighbor cell load information transmitted from the serving cell.

In an alternative aspect, one could envision behavior in asynchronous systems dependent on UE capability (e.g., ability to maintain multiple Rx timing, Tx BW capability (10 MHz vs. 20 MHz, and peak data rate capability). The UE is aware whether the system is synchronous or not, and the information is transmitted as part of system parameters on BCH (broadcast channel).

Figure 2:
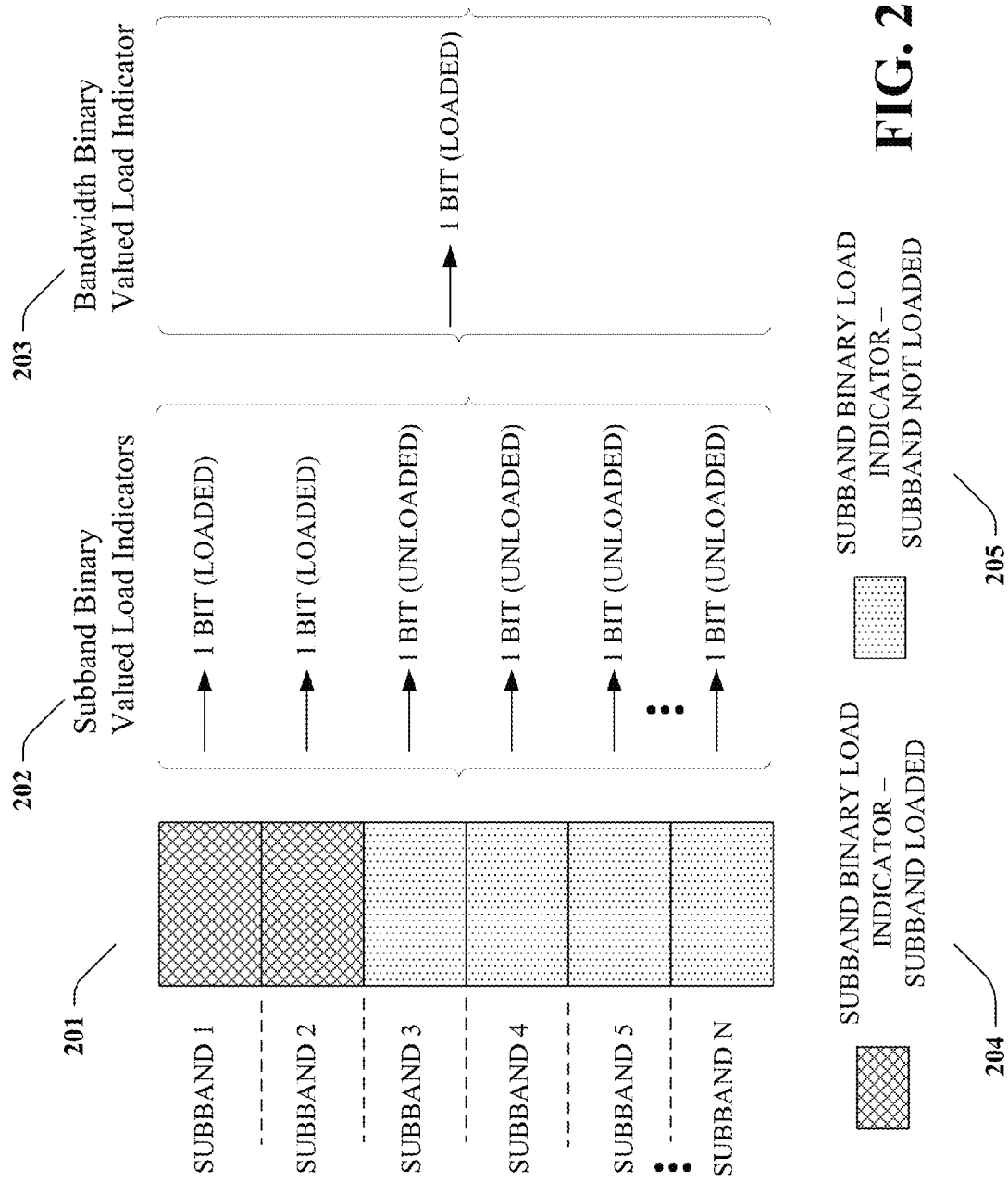
FIG. 2 is an exemplary illustration of sub-band binary load indicators and bandwidth binary load indicators.

FIG. 2 provides an illustration of an aspect of the current invention. As pictured, a given bandwidth comprises a number of subbands 201 (e.g. subbands 1 to N). Each subband then provides a binary valued load indicator 202 showing if that subband is in use 204 or is available for use 205 in a particular cell. The finer granularity can be seen when compared to the bandwidth binary valued load indicator as provided with subband division 203, where subbands 3 to N are actually available when subbands 1 and 2 are in use.

In another aspect, the determination of whether a subband is loaded is based on the load factor for that subband rising above a pre-determined threshold value.

The preceding discussion focused on dividing bandwidth into subbands for a given cell. It is to be understood that the disclosed aspects are not limited by this example and includes other applications such as dividing a cell into sectors and then dividing the sector bands into subbands.

Figure 3:
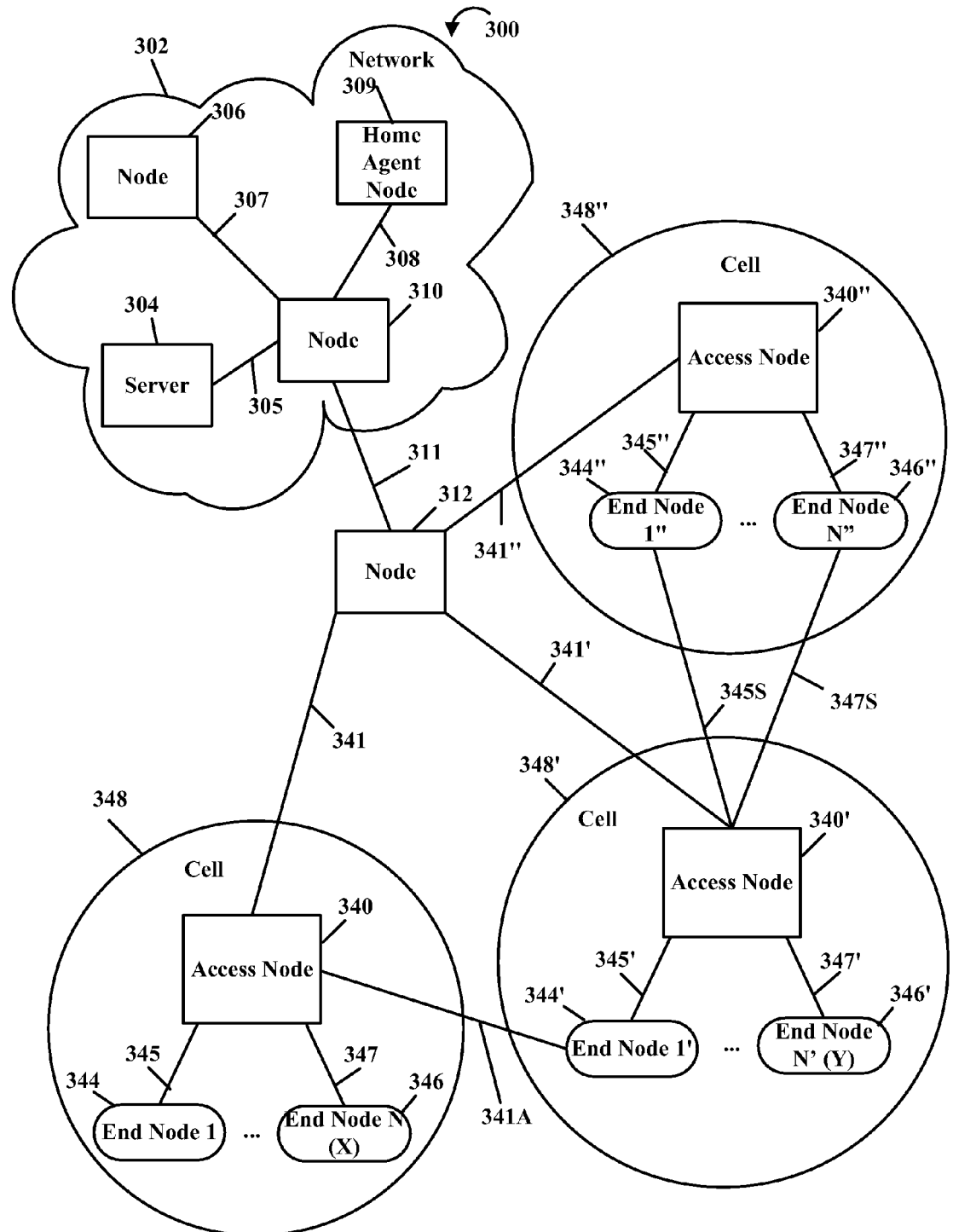
FIG. 3 is an illustration of an exemplary communication system (e.g., a cellular communication network) implemented in accordance with various aspects.

With reference to FIG. 3, illustrated is an exemplary communication system 300 (e.g., a cellular communication network) implemented in accordance with various aspects, which comprises a plurality of nodes interconnected by communications links 305, 307, 308, 311, 341, 341', 341", 341A, 345, 345', 345", 345S, 347, 347', 347" and 347S, Nodes in exemplary communication system 300 may exchange information using signals (e.g., messages) based on communication protocols (e.g., the Internet Protocol (IP)). The communications links of system 300 may be implemented, for example, using wires, fiber optic cables, and/or wireless communications techniques. Exemplary communication system 300 includes a plurality of end nodes 344, 346, 344', 346', 344", 346", which access communication system 300 via a plurality of access nodes 340, 340', and 340". End nodes 344, 346, 344', 346', 344", 346" may be, e.g., wireless communication devices or terminals, and access nodes 340, 340', 340" may be, e.g., wireless access routers or base stations. Exemplary communication system 300 also includes a number of other nodes 304, 306, 309, 310, and 312, used to provide interconnectivity or to provide specific services or functions (e.g. backhaul path for serving and non-serving cell subband binary value load indicator data). Specifically, exemplary communication system 300 includes a Server 304 used to support transfer and storage of state pertaining to end nodes. The Server 304 may be an AAA server, a Context Transfer Server, a server including both AAA server functionality and Context Transfer server functionality.

Exemplary communication system 300 depicts a network 302 that includes Server 304, node 306 and a home agent node 309, which are connected to an intermediate network node 310 by corresponding network links 305, 307 and 308, respectively. Intermediate network node 310 in network 302 also provides interconnectivity to network nodes that are external from the perspective of network 302 via network link 311. Network link 311 is connected to another intermediate network node 312, which provides further connectivity to a plurality of access nodes 340, 340', 340" via network links 341, 341', 341", respectively.

Each access node 340, 340', 340" is depicted as providing connectivity to a plurality of N end nodes (344, 346), (344', 346'), (344", 346"), respectively, via corresponding access links (345, 347), (345', 347'), (345", 347"), respectively. In synchronous systems, access links such as 345S and 347S may also be available. In synchronous or asynchronous systems, end nodes may have the capability of establishing access links to access nodes outside their own cell environments depicted by 341A. In exemplary communication system 300, each access node 340, 340', 340" is depicted as using wireless technology (e.g., wireless access links) to provide access. A radio coverage area (e.g., communications cells 348, 348', and 348") of each access node 340, 340', 340", respectively, is illustrated as a circle surrounding the corresponding access node.

Exemplary communication system 300 is presented as a basis for the description of various aspects set forth herein. Further, various disparate network topologies are intended to fall within the scope of the claimed subject matter, where the number and type of network nodes, the number and type of access nodes, the number and type of end nodes, the number and type of Servers and other Agents, the number and type of links, and the interconnectivity between nodes may differ from that of exemplary communication system 300 depicted in FIG. 3. Additionally, functional entities depicted in exemplary communication system 100 may be omitted or combined. Also, the location or placement of the functional entities in the network may be varied.

Control traffic is often transmitted with channel-independent rates. Cell edge users generally experience severe channel impairments and more likely become power limited. As well as power limitations, error rates may increase and advanced error control mechanisms such as H-ARQ may not be as applicable to control traffic as well as data. The interference-over-thermal (IoT) operating level is typically limited by control traffic from cell edge users. These factors contribute to an often low IoT operation point, e.g., around 5 dB. Thus the uplink load metric (e.g. the IoT operating level) is typically limited by control traffic from cell edge users.

However, users with good channel conditions are less likely to be power-limited and capable of supporting a much higher IoT point. The inflexible and low IoT operation level from the cell edge thus makes the uplink load management for data traffic unnecessarily inefficient.

An uplink load management mechanism is described which exploits distinct uplink load operating level requirements for subbands, instead of a same operation level across an entire available band, and is robust to serve a variety of cell types (e.g. synchronous or asynchronous) as well as end node capability (e.g. capable to produce path 341A). By introducing and properly managing subband dependent uplink load information, larger per user throughput and sector throughput can be achieved.

The configuration of subbands can be dynamically changed over time and may adapt to system conditions, and can be different for different sectors (not shown).

Figure 4:
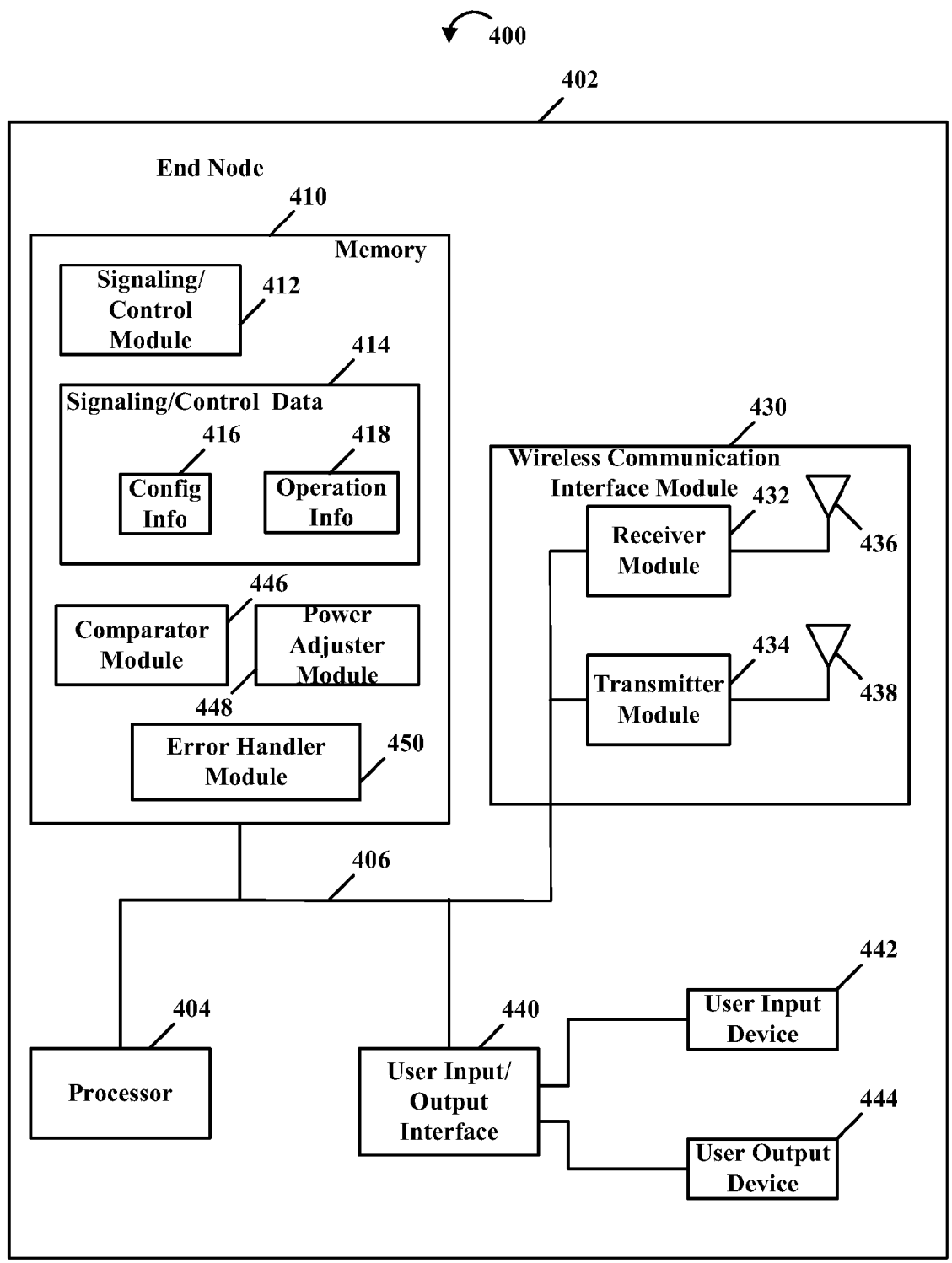
FIG. 4 is an illustration of an exemplary end node (e.g., a mobile node) associated with various aspects.

FIG. 4 illustrates an exemplary end node 400 (e.g., a mobile node, a wireless terminal) associated with various aspects. Exemplary end node 400 may be an apparatus that may be used as any one of the end nodes depicted in FIG. 3 (e.g. 344, 346, 344', 346', 344", 346"). As depicted, end node 400 includes a processor 404, a wireless communication interface 430, a user input/output interface 440 and memory 410 coupled together by a bus 406. Accordingly, various components of end node 400 can exchange information, signals and data via bus 406. Components 404, 406, 410, 430, 440 of end node 400 may be located inside a housing 402.

Wireless communication interface 430 provides a mechanism by which the internal components of the end node 400 can send and receive signals to/from external devices and network nodes (e.g., access nodes). Wireless communication interface 430 includes, for example, a receiver module 432 with a corresponding receiving antenna 436 and a transmitter module 434 with a corresponding transmitting antenna 438 used for coupling end node 400 to other network nodes (e.g., via wireless communications channels).

Exemplary end node 400 also includes a user input device 442 (e.g., keypad) and a user output device 444 (e.g., display), which are coupled to bus 406 via user input/output interface 440. Thus, user input device 442 and user output device 444 can exchange information, signals and data with other components of end node 400 via user input/output interface 440 and bus 406. User input/output interface 440 and associated devices (e.g., user input device 442, user output device 444) provide a mechanism by which a user can operate end node 400 to accomplish various tasks. In particular, user input device 442 and user output device 444 provide functionality that allows a user to control end node 400 and applications (e.g., modules, programs, routines, functions, etc.) that execute in memory 410 of end node 400.

Processor 404 may be under control of various modules (e.g., routines) included in memory 410 and may control operation of end node 400 to perform various signaling and processing as described herein. The modules included in memory 410 are executed on startup or as called by other modules. Modules may exchange data, information, and signals when executed. Modules may also share data and information when executed. Memory 410 of end node 400 may include a signaling/control module 412 and signaling/control data 414.

Signaling/control module 412 controls processing relating to receiving and sending signals (e.g., messages) for management of state information storage, retrieval, and processing. Signaling/control data 414 includes state information such as, for instance, parameters, status, and/or other information relating to operation of the end node. In particular, signaling/control data 414 may include configuration information 416 (e.g., end node identification information) and operational information 418 (e.g., information about current processing state, status of pending responses, etc.). Signaling/control module 412 may access and/or modify signaling/control data 414 (e.g., update configuration information 416 and/or operational information 418).

Memory 410 of end node 400 may also include a comparator module 446, a power adjuster module 448, and/or an error handler module 450. Although not depicted, it is to be appreciated that comparator module 446, power adjuster module 448, and/or error handler module 450 may store and/or retrieve data associated therewith that may be stored in memory 410. Comparator module 446 may evaluate received information associated with end node 400 and effectuate a comparison with expected information.

Figure 5:
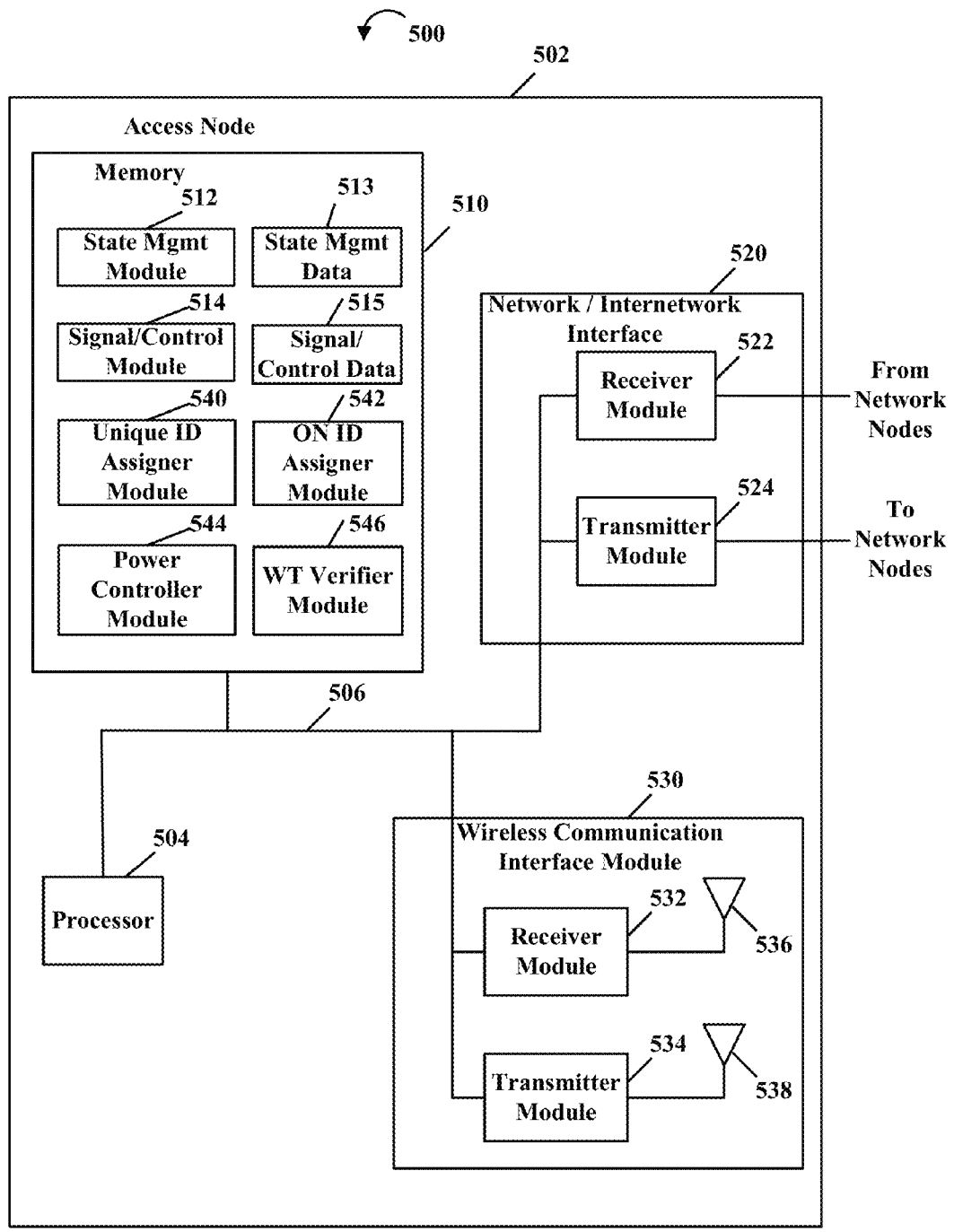
FIG. 5 is an illustration of an exemplary access node implemented in accordance with various aspects described herein.

FIG. 5 provides an illustration of an exemplary access node 500 implemented in accordance with various aspects described herein. Exemplary access node 500 may be an apparatus utilized as any one of access nodes depicted in FIG. 3 (e.g., 340, 340', and 340"). Access node 500 may include a processor 504, memory 510, a network/internetwork interface 520 and a wireless communication interface 530, coupled together by a bus 506. Accordingly, various components of access node 500 can exchange information, signals and data via bus 506. The components 504, 506, 510, 520, 530 of the access node 500 may be located inside a housing 502.

Network/internetwork interface 520 provides a mechanism by which the internal components of access node 500 can send and receive signals to/from external devices and network nodes. Network/internetwork interface 520 includes a receiver module 522 and a transmitter module 524 used for coupling access node 500 to other network nodes (e.g., via copper wires or fiber optic lines). Wireless communication interface 530 also provides a mechanism by which the internal components of access node 500 can send and receive signals to/from external devices and network nodes (e.g., end nodes). Wireless communication interface 530 includes, for instance, a receiver module 532 with a corresponding receiving antenna 536 and a transmitter module 534 with a corresponding transmitting antenna 538. Wireless communication interface 530 may be used for coupling access node 500 to other network nodes (e.g., via wireless communication channels).

Processor 504 may be under control of various modules (e.g., routines) included in memory 510 and may control operation of access node 500 to perform various signaling and processing. The modules included in memory 510 may be executed on startup or as called by other modules that may be present in memory 510. Modules may exchange data, information, and signals when executed. Modules may also share data and information when executed. By way of example, memory 510 of access node 500 may include a State Management module 512 and a Signaling/Control module 514. Corresponding to each of these modules, memory 510 also includes State Management data 513 and the Signaling/Control data 515.

State Management Module 512 controls the processing of received signals from end nodes or other network nodes regarding state storage and retrieval. State Management Data 513 includes, for instance, end-node related information such as the state or part of the state, or the location of the current end node state if stored in some other network node. State Management module 512 may access and/or modify State Management data 513.

Signaling/Control module 514 controls the processing of signals to/from end nodes over wireless communication interface 530 and to/from other network nodes over network/internetwork interface 520 as necessary for other operations such as basic wireless function, network management, etc. Signaling/Control data 515 includes, for example, end-node related data regarding wireless channel assignment for basic operation, and other network-related data such as the address of support/management servers, configuration information for basic network communications. Signaling/Control module 514 may access and/or modify Signaling/Control data 515.

Memory 510 may additionally include a unique identification (ID) assigner module 540, an ON identification (ID) assigner module 542, a power controller module 544, and/or a wireless terminal (WT) verifier module 546. It is to be appreciated that unique ID assigner module 540, ON ID assigner module 542, power controller module 544, and/or WT verifier module 546 may store and/or retrieve associated data retained in memory 510. Further, unique ID assigner module 540 may allocate a terminal identifier (e.g., scrambling mask) to a wireless terminal. ON ID assigner module 542 may assign an ON identifier to a wireless terminal while the wireless terminal is in session ON state. Power controller module 544 may transmit power control information to a wireless terminal. WT verifier module 546 may enable including wireless terminal related information in a transmission unit.

Figure 6:
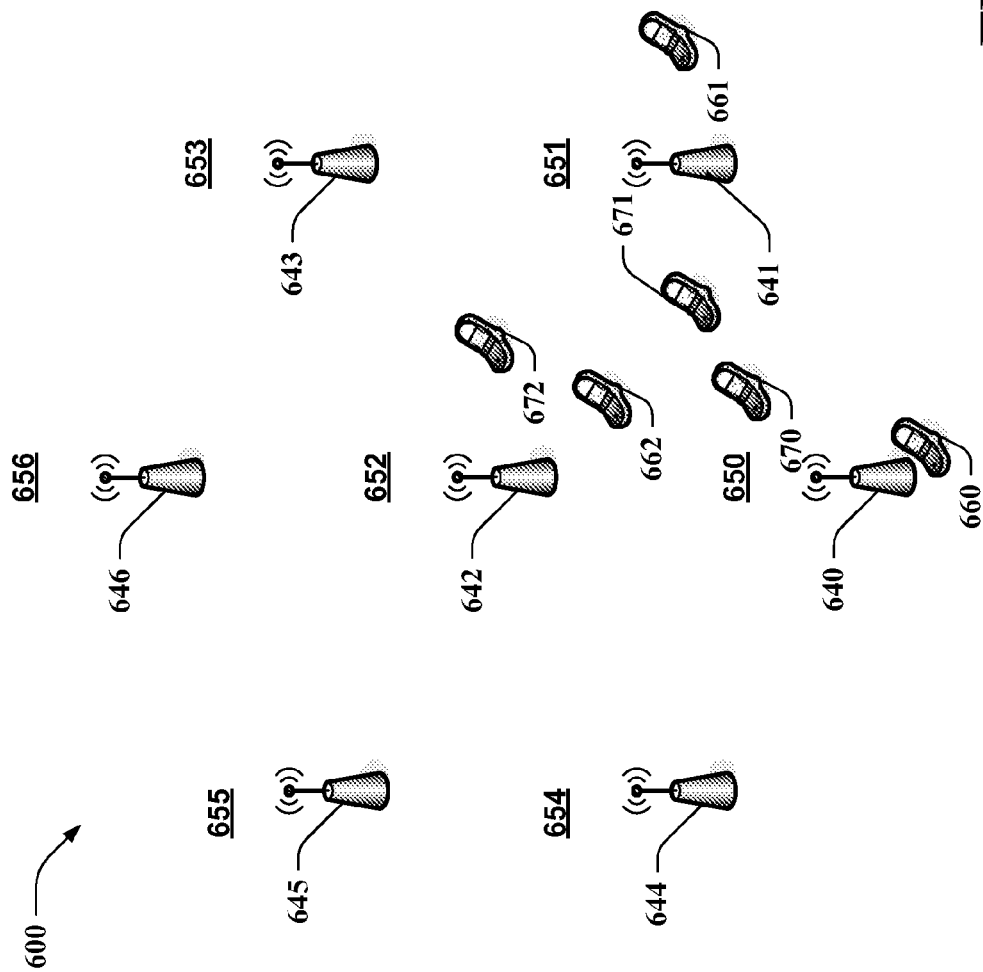
FIG. 6 is an illustration of an exemplary multi-cell system showing a cell and its neighbors.

FIG. 6 provides an illustration of an exemplary aspect of cell neighbors in a multi-cell network 600. A cell as represented by its service area 652 has neighbor cells 650, 651, 653, 654, 655 and 656. These neighbor cells are adjacent to cell 652. These service areas are analogous to FIG. 3 (e.g., 348, 348', and 348"). Equally, a cell may be represented by access node 642 and its neighbors 640, 641, 643, 644, 645 and 646. These are analogous to FIG. 3 (e.g., 340, 340', 340"). For a device or User Equipment (UE) 660 within a service area 650, the UE is served by the cell 650 if the cell 650 is the primary provider of resources for the UE. According to an aspect of the current invention, each cell broadcasts (e.g. on the BCH channel) the subband binary valued load indicator data for subbands 1 to N (binary data bits 1 to N for the frequency subbands in use in that cell). In addition to its own load indicator data, the cell through the backhaul channel will also transmit the binary valued load indicator data on a sub-band basis for its neighbors cell activity. At a minimum, access node 642 provides the load data for end nodes 662 and 672 as well as which subbands all neighboring cells are using including end nodes 660, 670, 671 and 661.

Note, that while this an exemplary model, this invention is not limited to this model and covers all permutations as captured in the claims. If the cells are sectored as in a frequency reuse scenario, then the adjacent sector load metric per sub-band would be transmitted (not shown).

Figure 7:
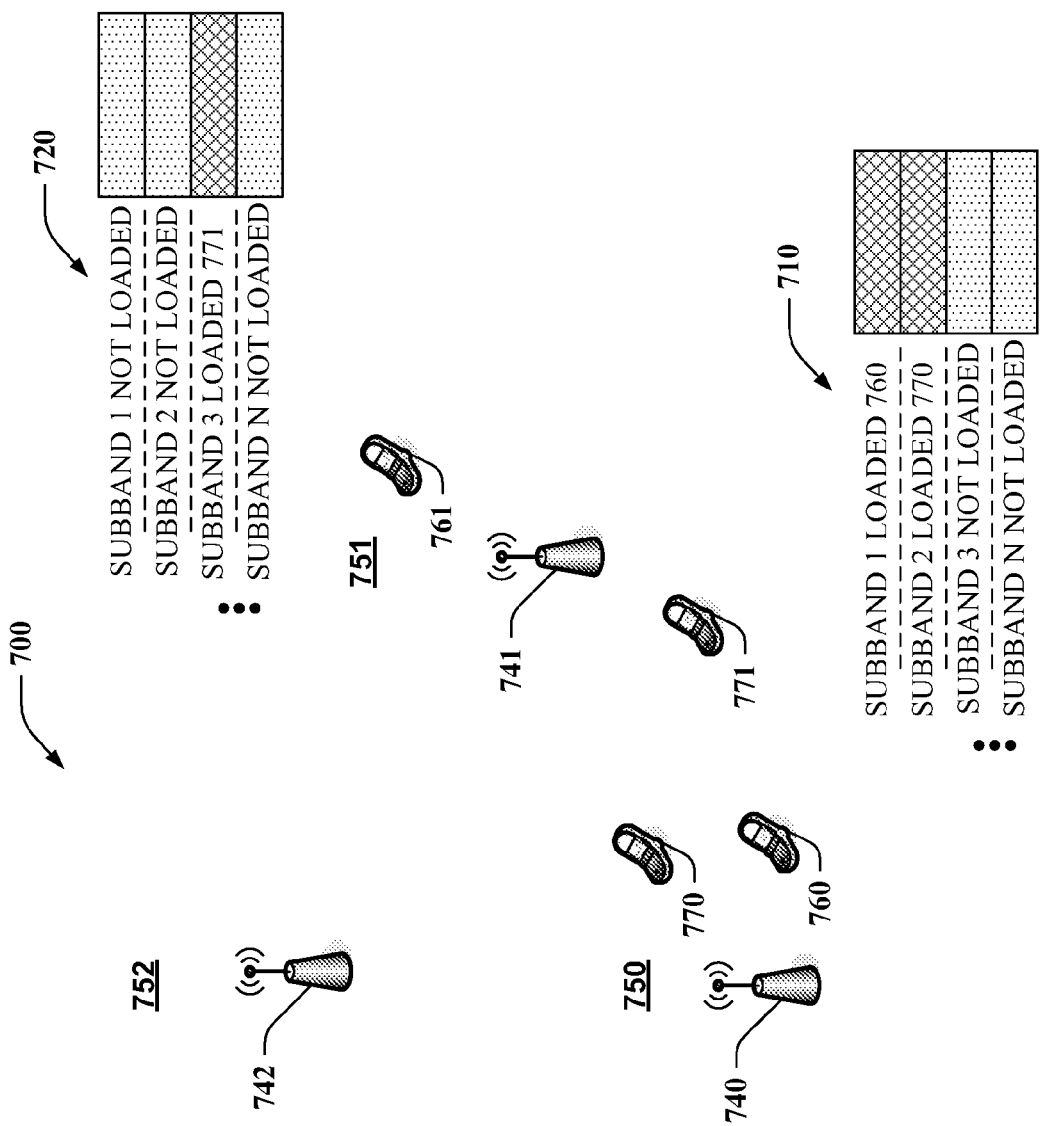
FIG. 7 is an illustration of an exemplary aspect of inter-cell interference that the present application controls.

Referring now to FIG. 7, an exemplary aspect 700 of inter-cell interference mitigation is presented. In cell 750, end nodes 770 and 760 use subbands 1 and 2 as represented by the subband load indicator aspect 710. For that same frequency band, also used in cell 751, the subband load indicator aspect 720 illustrates which subband end node 771 is using. As illustrated, end node 761 is using a different frequency band altogether. This allows the PSD of subbands 771, 760 and 770 to remain at their respective levels since the increased granularity allows more efficient and denser use of the frequency subbands in the given frequency used in the different cells. The subband load indicators illustrates that even though the end nodes are all in the same frequency band, there is no interference, and allows more complete use of the resources.

In view of exemplary aspects described herein, methodologies that can be implemented in accordance with the disclosed subject matter are discussed. While, for purposes of simplicity, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement respective methodologies. It is to be appreciated that the functionality associated with various blocks may be implemented by software, hardware, a combination thereof or any other suitable means (e.g., device, system, process component). Additionally, it should be further appreciated that some methodologies disclosed hereinafter and throughout this specification are capable of being stored on an article of manufacture to facilitate transporting and transferring such methodologies to various devices. Those skilled in the art will appreciate and understand that a methodology can alternatively be represented as a series of interrelated states or events such as for example in a state diagram.

Figure 8:
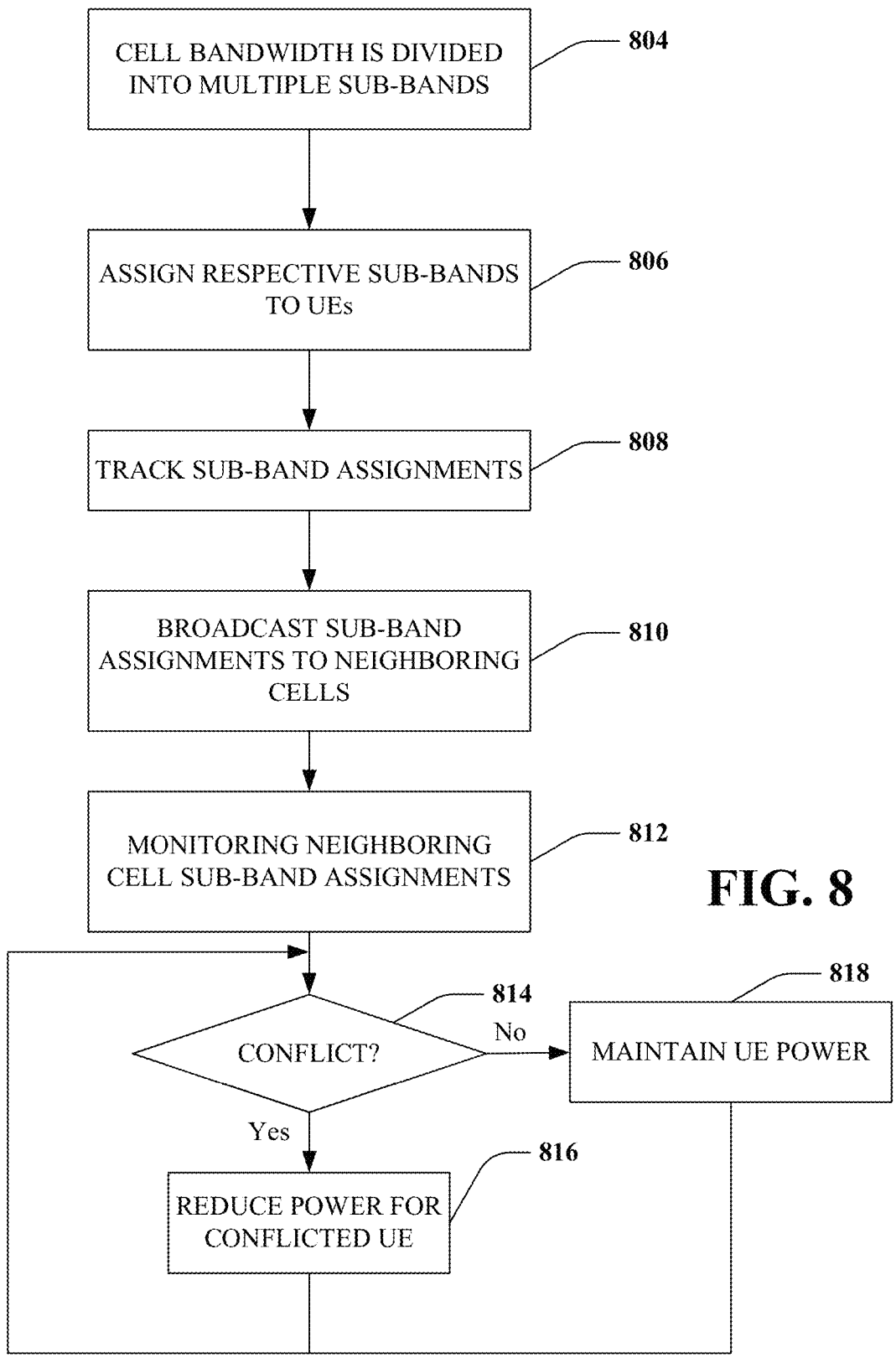
FIG. 8 is a flow diagram illustrating an aspect relating to mitigating inter-cell interference.

FIG. 8 illustrates a high-level methodology in accordance with various aspects. At 804, cell bandwidth is divided into N sub-bands (N being an integer>2). At 806, respective sub-bands are assigned to respective user equipment (UE). It is to be appreciated that a variety of assignment protocols can be employed in connection with making sub-band assignments. For example, respective sub-bands can be designated for particular purposes (e.g., data type, power level, distance, interference mitigation, load-balancing . . . ), and UEs can be respectively assigned to sub-bands as a function of affinity thereto. In another example, an optimization scheme can be employed in connection with assignments. Likewise, extrinsic information (e.g., environmental factors, preferences, QoS, customer preferences, customer ranking, historical information) can be employed. In another example, assignment can be a function of load-balancing across a cell or a plurality of cells.

An embodiment of the methodology can employ artificial intelligence techniques to facilitate automatically performing various aspects (e.g., transitioning communications resources, analyzing resources, extrinsic information, user/UE state, preferences, sub-band assignments, power level setting) as described herein. Moreover, inference based schemes can be employed to facilitate inferring intended actions to be performed at a given time and state. The AI-based aspects of the invention can be effected via any suitable machine-learning based technique and/or statistical-based techniques and/or probabilistic-based techniques. For example, the use of expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. are contemplated, preferences, sub-band assignments, power level setting) as described herein. Moreover, inference based schemes can be employed to facilitate inferring intended actions to be performed at a given time and state. The AI-based aspects of the invention can be effected via any suitable machine-learning based technique and/or statistical-based techniques and/or probabilistic-based techniques. For example, the use of expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. are contemplated.

At 808, sub-band assignments are tracked. At 810, sub-band assignments are broadcast to neighboring cells (e.g., to apprise base stations or UEs in such neighboring cells of sub-band assignments). At 812, neighboring cell sub-band assignments are monitored. At 814, as a function of such monitoring, if it is determined that a conflict exists with respect to sub-band assignments at 816 control information is sent to particular UEs to reduce power in connection with mitigating inter-cell interference due to the conflict, for example. If no conflict exists, at 818 the UEs maintain power level.

It can be readily appreciated from the foregoing that by sub-dividing bandwidth into respective sub-bands a more granular tuning of UE power-level can be achieved as compared to conventional schemes. As a result, overall system resource utilization as well as inter-cell interference mitigation is facilitated.

Figure 9:
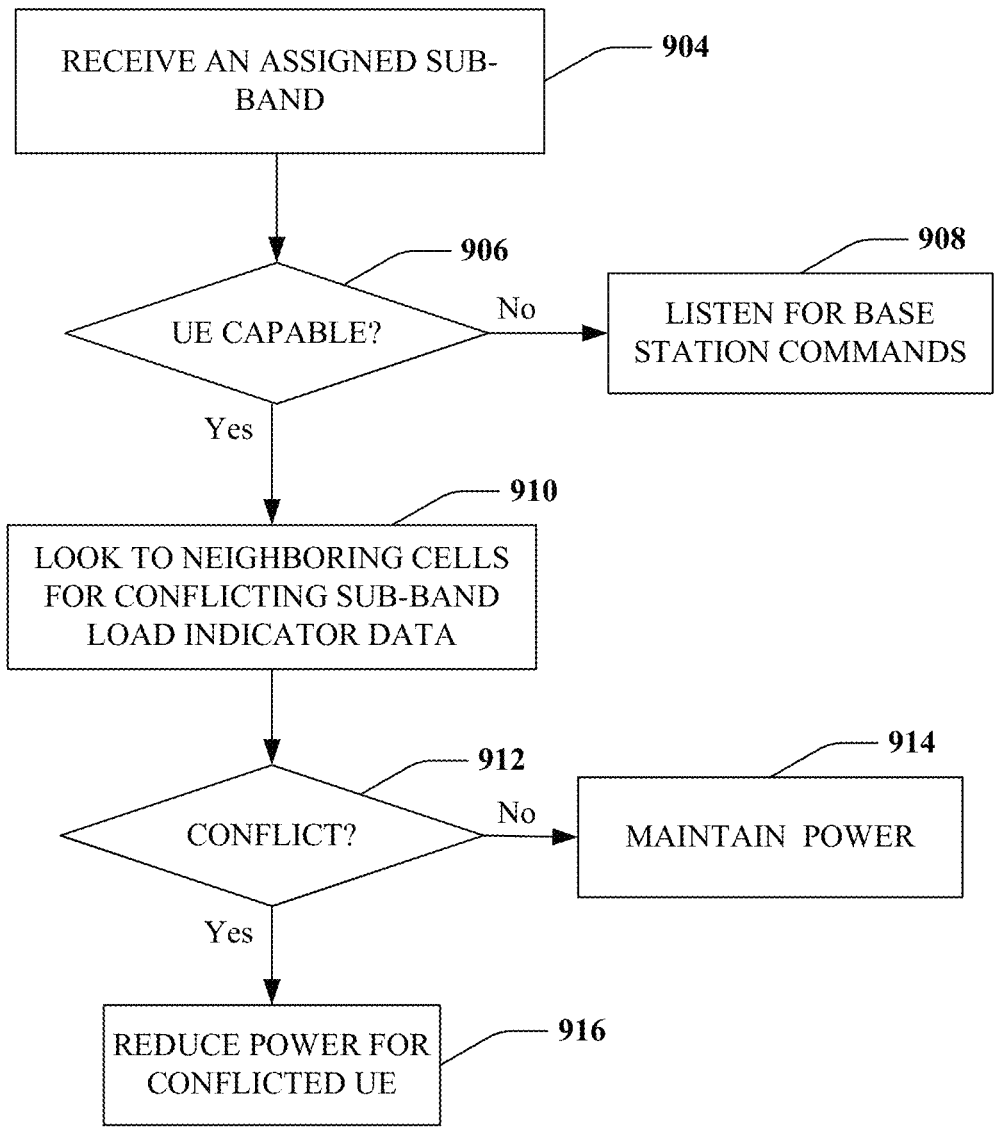
FIG. 9 is a flow diagram illustrating an aspect relating to mitigating inter-cell interference.

FIG. 9 illustrates a high-level methodology in accordance with various aspects. At 904, sub-band assignment(s) are received by a user equipment. At 906, a determination or identification is made as to respective capabilities/functionalities of the UE. If the UE is deemed to not possess certain capabilities/functionalities, the UE simply listens for commands from a base station in connection with sub-band assignments at 908. However, if the UE does possess certain capabilities or functionalities in connection with aspects described herein, at 910, the UE looks to neighboring cells for conflicting sub-band load indicator data. At 912, a determination is made regarding whether or not a conflict exists as a function of respective sub-band load indicator data. If a conflict does exist, a 916, the UE reduces power level to mitigate interference it may cause. If it is determined that a conflict does not exist, at 914, the UE maintains power level.

Figure 10:
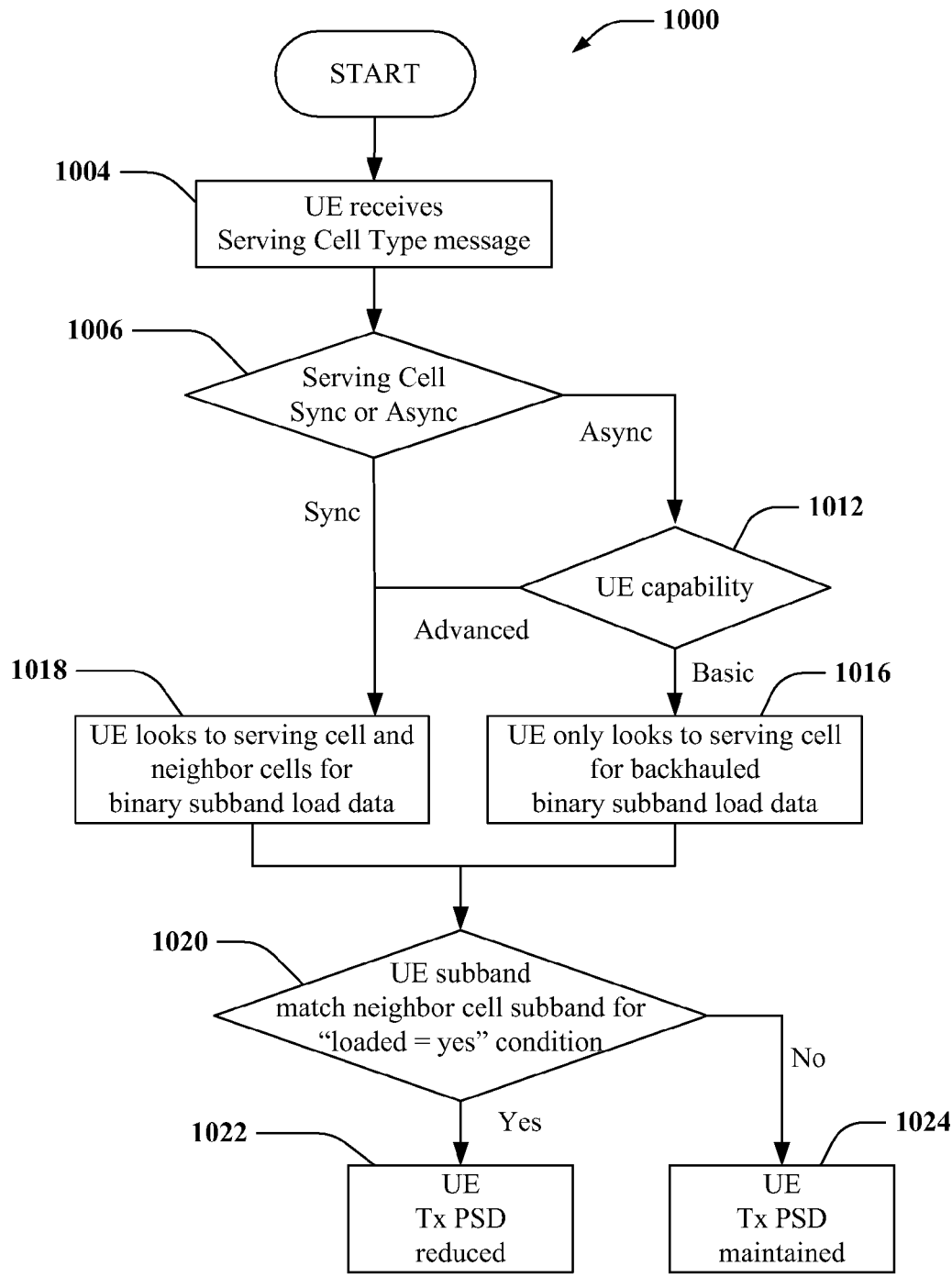
FIG. 10 is an exemplary logic flow diagram for UE based inter-cell interference mitigation in synchronous and asynchronous orthogonal systems in accordance with various aspects.

FIG. 10 highlights exemplary logic for a management method in accordance with various aspects. The management method 1000 is for a UE based inter-cell interference mitigation system that robustly handles both synchronous and asynchronous orthogonal systems. At 1004, for each UE in a given serving cell, the UE receives a serving cell Type message indicating whether the serving cell is operating in synchronous or asynchronous mode. At 1006, the UE determines or is informed of whether a serving cell is synchronous or asynchronous. If the cell is synchronous, the process proceeds to 1018 where the UE looks to the serving cell or neighboring cells for binary sub-band load data. If at 1006, the cell is asynchronous, the process proceed to 1012 where capabilities of the UE are assessed. If the UE is deemed to have advanced capabilities, the process proceeds to 1018. If the UE is deemed to have basic capabilities, the process proceeds to 1016 where the UE looks to the serving cell for backhauled binary sub-band data. Block 1018 signifies various advantages (e.g. faster neighbor cell detection, neighbor cell load data being obtained directly from the neighbor cell). For other less capable UE, path 1016 will still provide the novel binary subband load data transmitted from UE's serving cell and obtained through the backhaul channel. In either path, the binary load data per sub-band is obtained and a comparison at 1020 then can take place.

At this point the finer granularity as shown in FIG. 7 will provide the UE with the control direction to take either step 1022 or 1024 with increased room for more UE operating in the different subbands of a given bandwidth.

Figure 11:
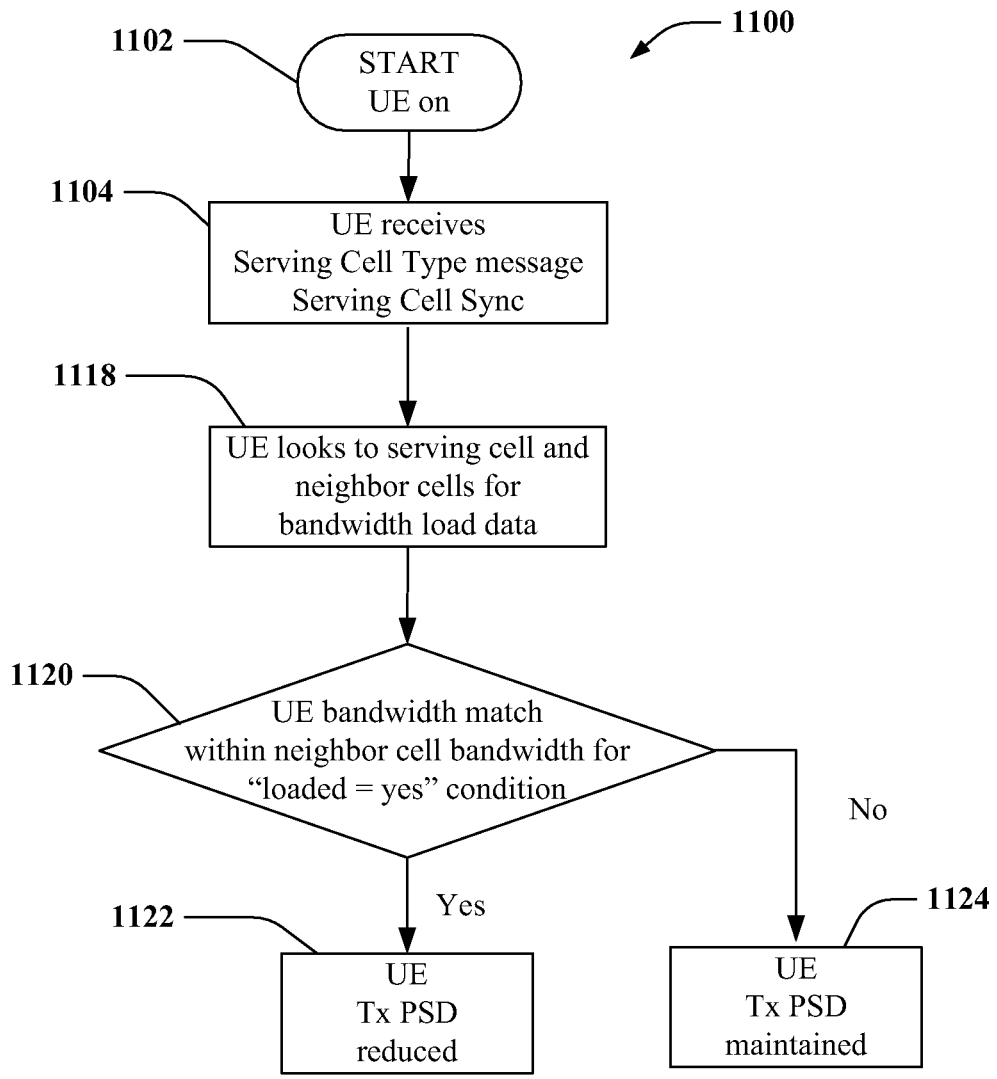
FIG. 11 is an exemplary logic flow diagram for UE based inter-cell interference mitigation in synchronous orthogonal systems FIG. 12. is an exemplary logic flow diagram for UE based inter-cell interference mitigation in asynchronous orthogonal systems
Figure 12:
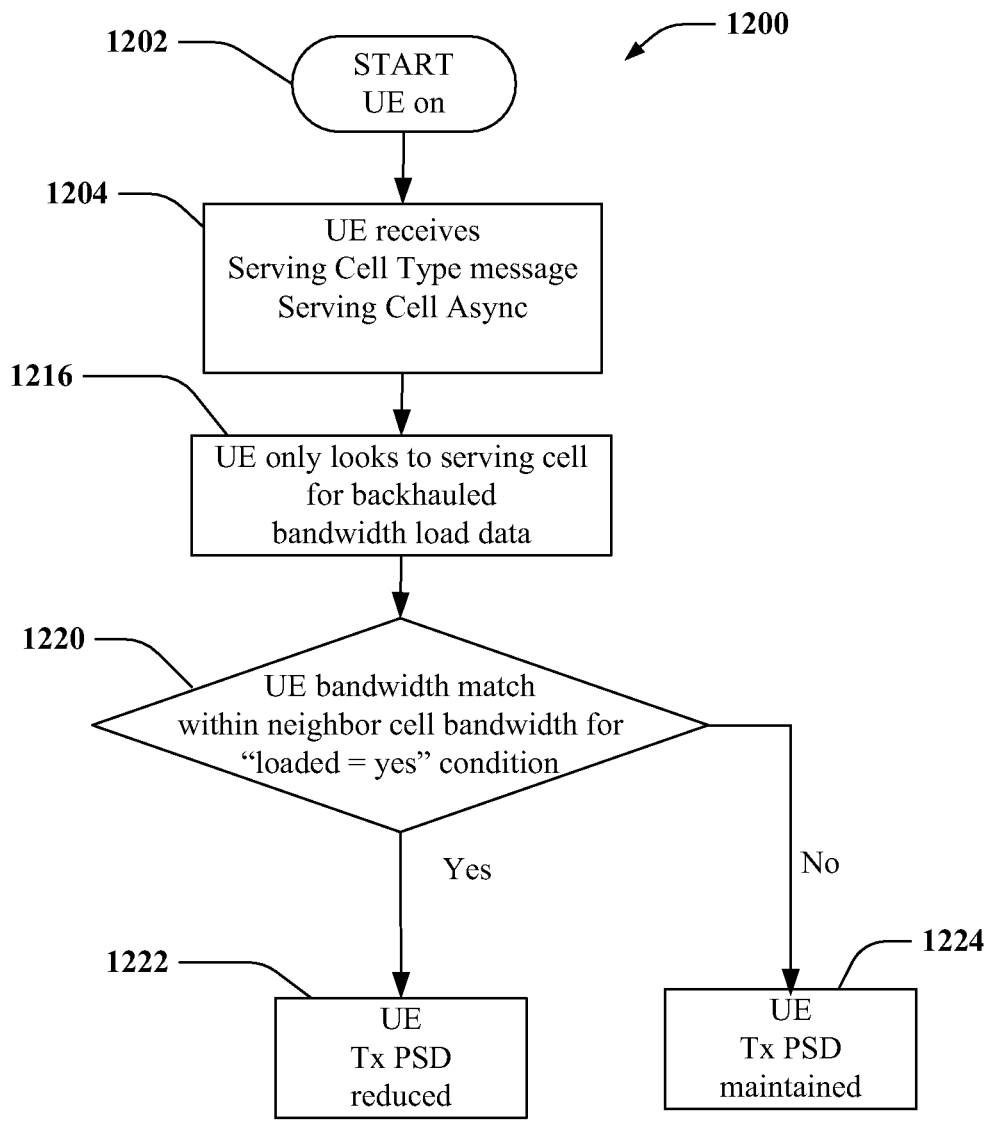

This can be contrasted with FIGS. 11 and 12, which shows the less robust conventional alternatives 1100 and 1200. In FIG. 11, upon start 1102, the UE receives the serving cell Type message 1104 and the serving cell type mandates the UE's next step 1118. Here the entire bandwidth of the neighboring cells' data as obtained directly and quickly from the neighbor cells and compared to the load data from the serving cell 1120. The less efficient direction (e.g. UE using non-interfering different subbands within matching bands will be indicated as causing interference when they in actuality are not) for the UE is dictated and either 1122 or 1124 will then be taken.

In FIG. 12, the UE at start 1202 receives the serving cell Type message 1204 which mandates step 1216. Here the entire bandwidth from the slower backhaul channel as provided by the serving cell is obtained and compared to the UE bandwidth in the serving cell 1220. The less efficient direction (e.g. UE using non-interfering different subbands within matching bands will be indicated as causing interference when they in actuality are not) for the UE is dictated and either 1222 or 1224 will then be taken. UE capability is ignored. The systems as represented in FIGS. 11 and 12 are also less UE based as the Serving Cell system mandates the path.

Figure 13:
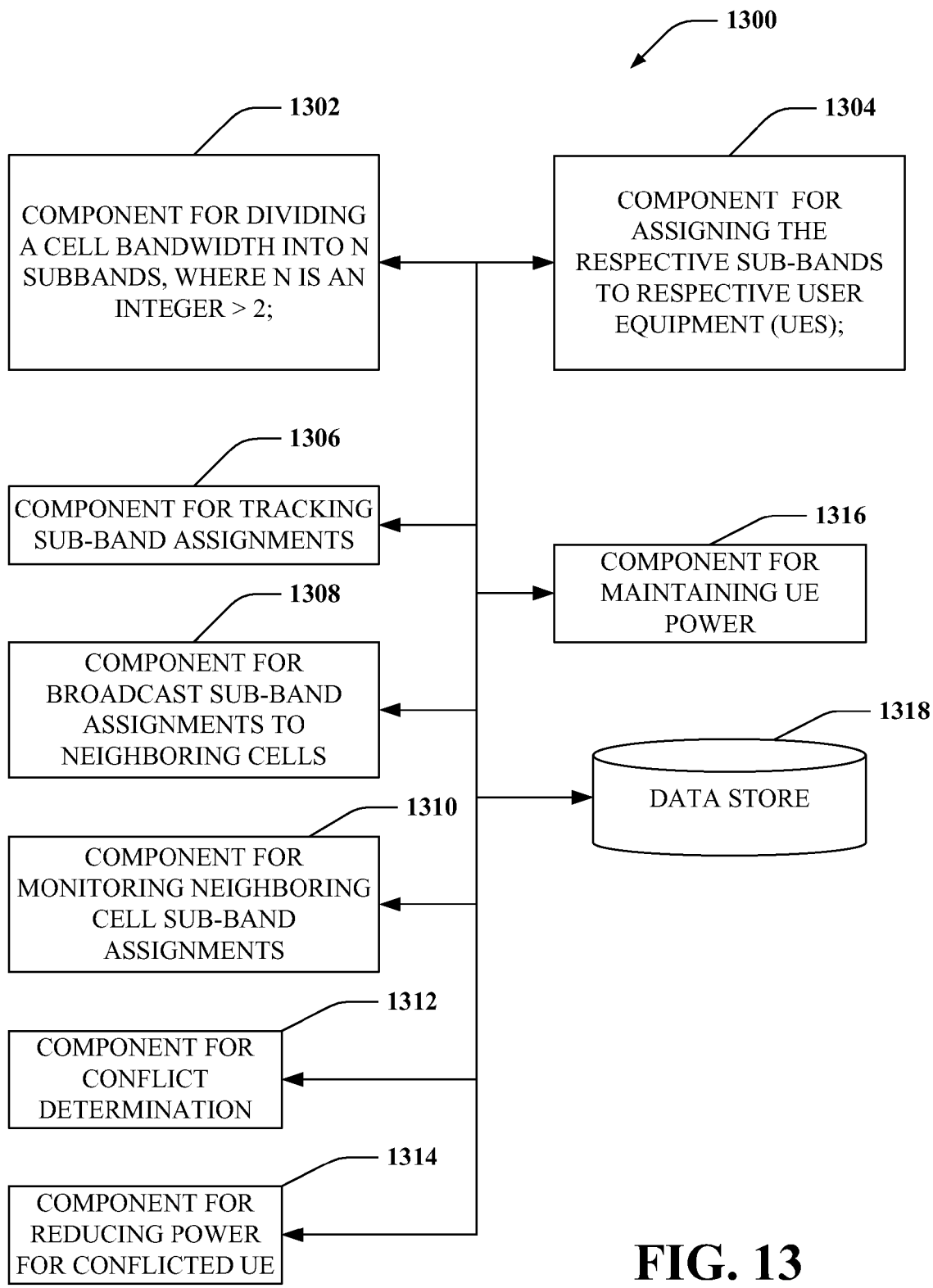
FIG. 13 is a system diagram illustrating a system that facilitates mitigating inter-cell interference.

FIG. 13 illustrates a system 1300 that facilitates mitigating inter-cell interference. Component 1302 divides cell bandwidth into N sub-bands (N being an integer>2). Component 1304 assigns respective sub-bands to respective user equipment (UE). It is to be appreciated that a variety of assignment protocols can be employed in connection with making sub-band assignments. For example, respective sub-bands can be designated for particular purposes (e.g., data type, power level, distance, interference mitigation, load-balancing . . . ), and UEs can be respectively assigned to sub-bands as a function of affinity thereto. In another example, an optimization scheme (e.g., employing artificial intelligence) can be employed in connection with assignments. Likewise, extrinsic information (e.g., environmental factors, preferences, QoS, customer preferences, customer ranking, historical information) can be employed. In another example, assignment can be a function of load-balancing across a cell or a plurality of cells.

Component 1306 tracks sub-band assignments, and component 1308 broadcasts sub-band assignments to neighboring cells (e.g., to apprise base stations or UEs in such neighboring cells of sub-band assignments). Component 1310 monitors neighboring cell sub-band assignments. Component 1312 determines if a conflict exists as a function of such monitoring, and if it is determined that a conflict exists with respect to sub-band assignments component 1314 sends control information to particular UEs to reduce power in connection with mitigating inter-cell interference due to the conflict, for example. If no conflict exists, component 1316 send control information to the UEs to maintain power level. Component 1318 serves as a data store.

Figure 14:
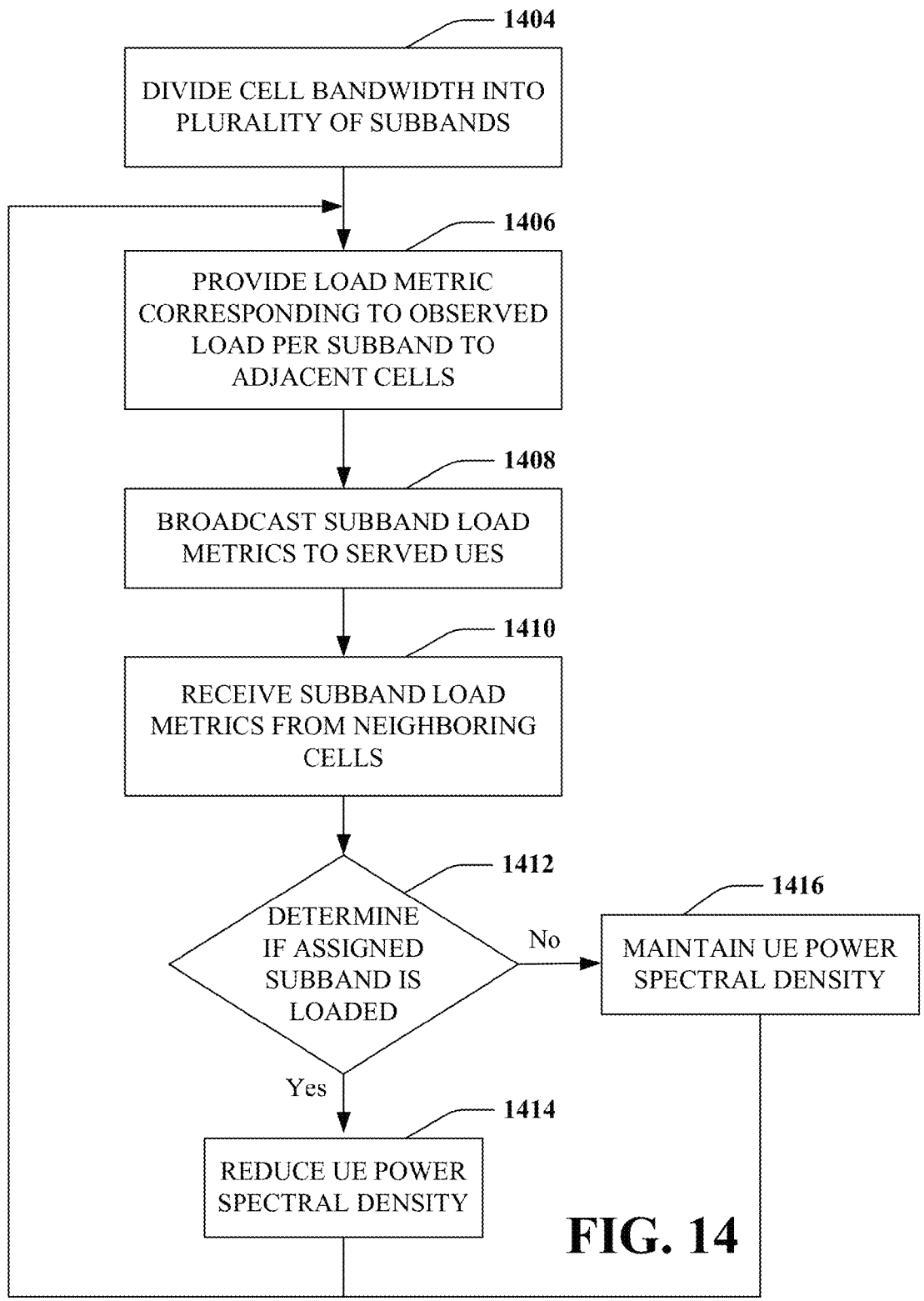
FIG. 14 is a flow diagram illustrating an aspect relating to mitigating inter-cell interference.

FIG. 14 illustrates a high-level methodology in accordance with various aspects. At 1404, cell bandwidth is divided into a plurality of sub-bands. At 1406, load metric corresponding to observed load on a per subband level is provided to adjacent cells. At 1408, the subband load metrics are broadcast to served UEs. At 1410, the serving cell receives subband load metrics from adjacent cells. With this information, at 1412 the serving cell can determine if the subband assignment for a served UE is loaded in an adjacent cell. At 1414, if it is determined that there is a loaded adjacent cell for the assigned subband, control information is sent to particular UEs to reduce power spectral density in connection for the conflicted UE. If no conflict exists, at 1416 the UEs maintain power spectral density level.

Figure 15:
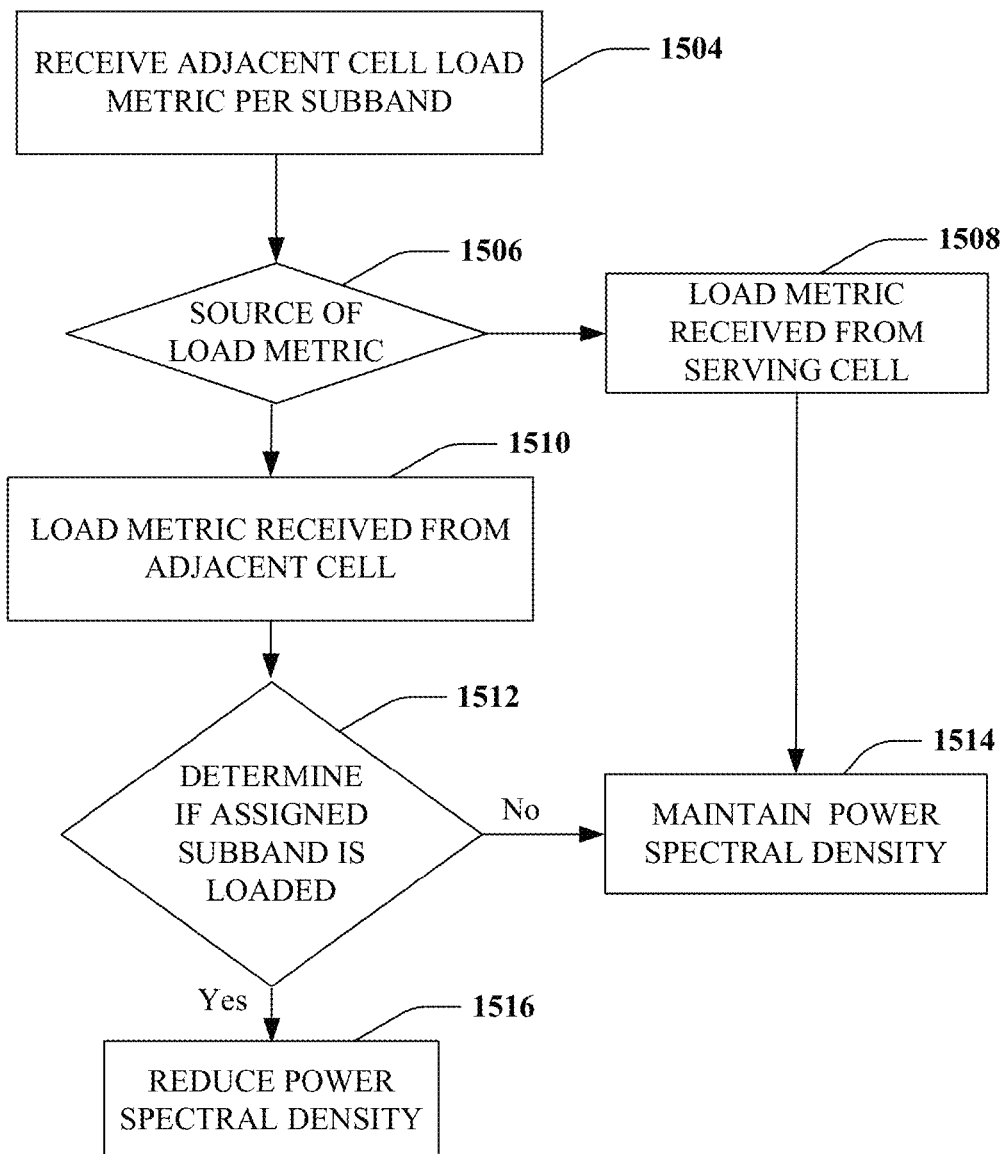
FIG. 15 is an exemplary logic flow diagram for UE based communication system in accordance with various aspects.

FIG. 15 illustrates a high-level methodology in accordance with various aspects. At 1504, adjacent cell load metrics per subband are received by a user equipment. At 1506, a determination is made as to the source of the load metric information. If the load metric information is received from the serving cell 1508, the UE maintains the assigned transmit power spectral density 1514. If the source of the load metric is directly an adjacent cell 1510, the load metric is evaluated at 1512, where a determination is made regarding whether or not the assigned subband is loaded or not. The determination of whether an assigned subband is loaded can be based on the load factor for that subband rising above a pre-determined threshold value. If the assigned subband is not loaded, transmit power spectral density is maintained at 1514. If the load metric indicates a loaded assigned subband in the adjacent cell, the UE reduces its assigned transmit power spectral density 1516.

Figure 16:
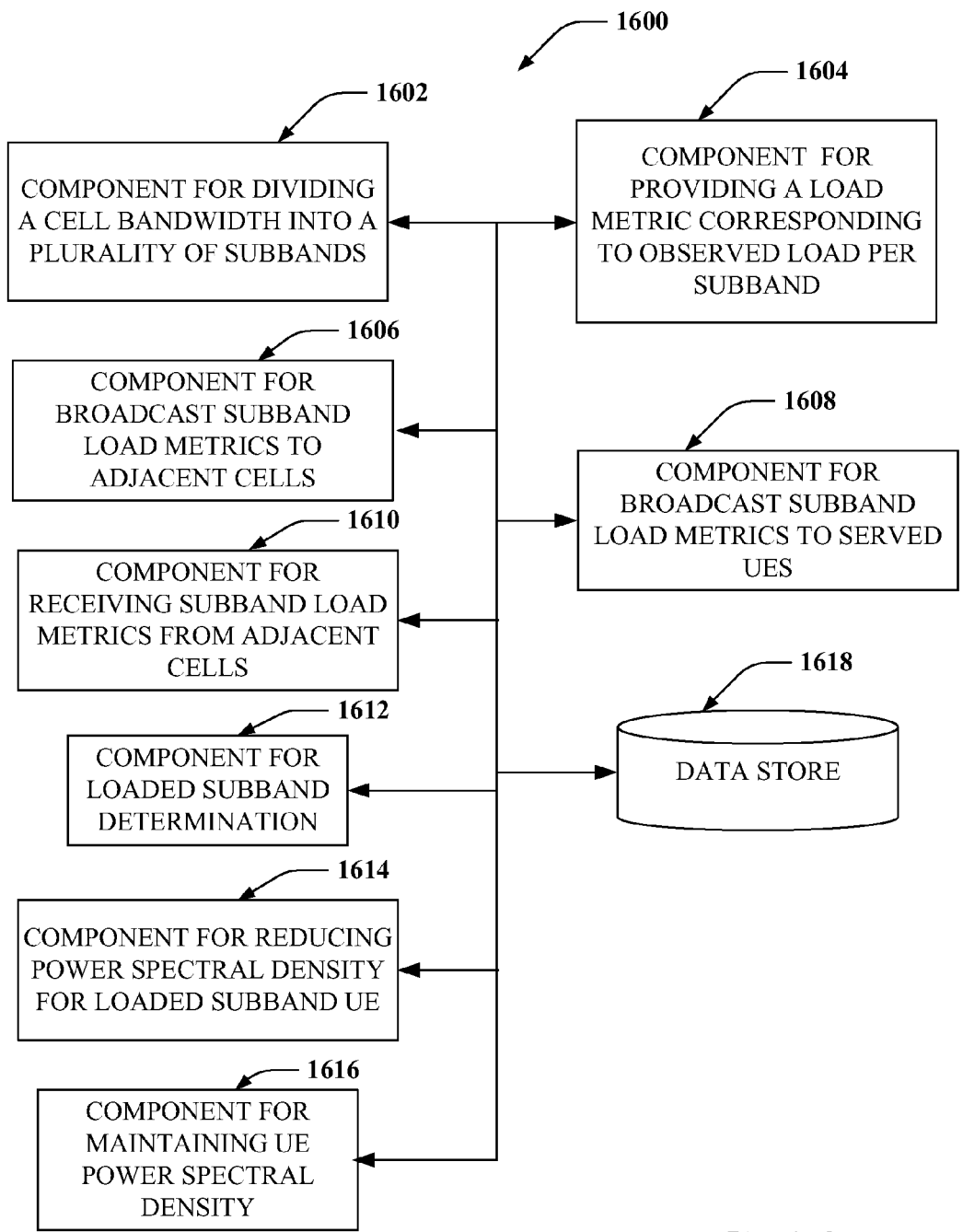
FIG. 16 is a system diagram illustrating a system that facilitates mitigating inter-cell interference.

FIG. 16 illustrates a system 1600 that facilitates mitigating inter-cell interference. Component 1602 divides cell bandwidth into a plurality of sub-bands. Component 1604 provides a load metric corresponding to observed load per subband. Component 1606 broadcasts subband load metrics to neighboring cells and component 1608 broadcasts subband load metrics to served UEs. Component 1610 receives subband load metrics from adjacent cells. Component 1612 determines if the subband assignment for a served UE is loaded in an adjacent cell. 1614 is a component for reducing power spectral density for the UE when the subband assignment for a served UE is loaded in an adjacent cell while 1616 is a component for maintaining UE power spectral density and is used if the subband assignment for a served UE is not loaded in an adjacent cell. 1618 serves as a data store.

Figure 17:
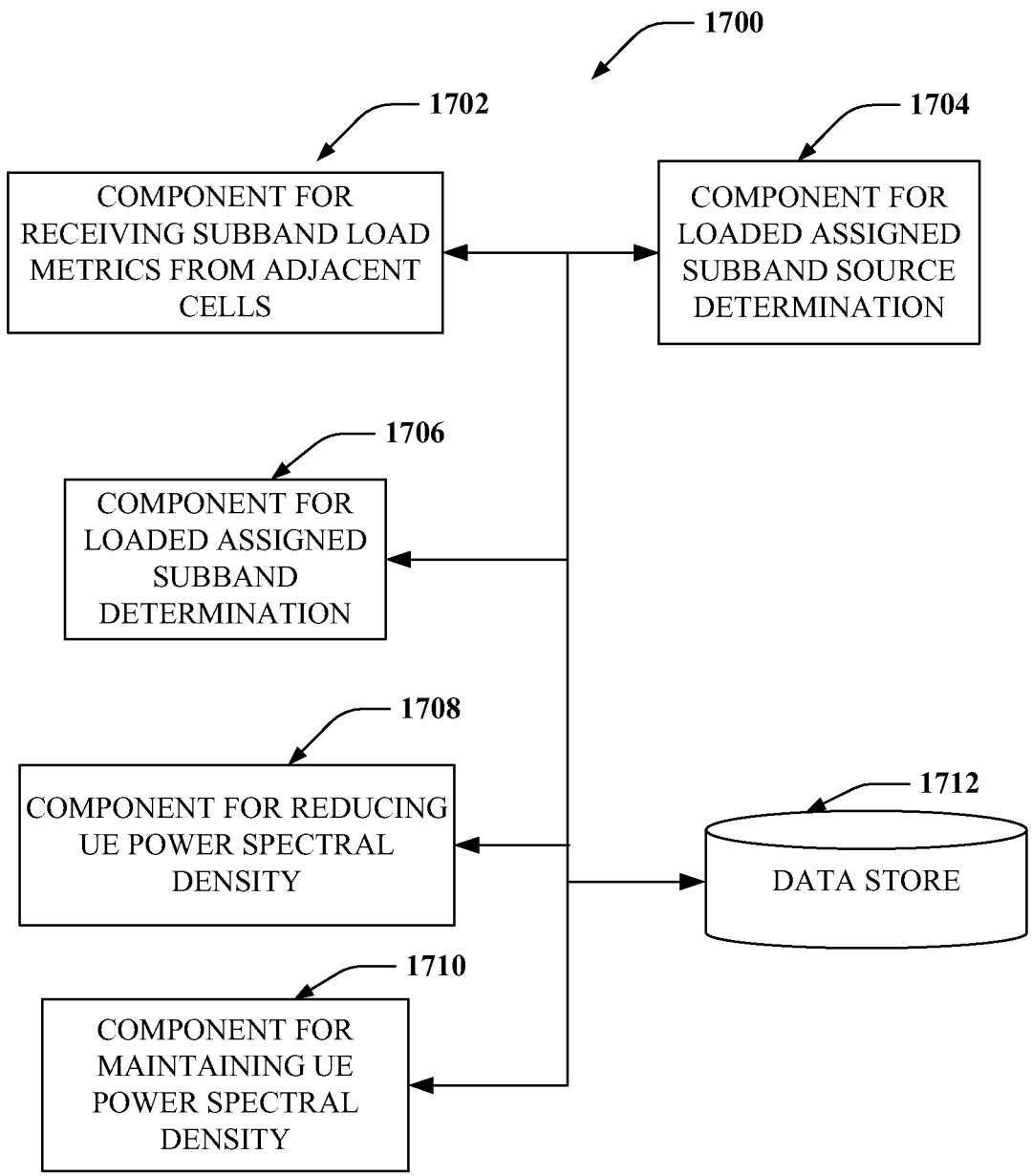
FIG. 17 is a system diagram illustrating a system for UE based communication system in accordance with various aspects.

FIG. 17 illustrates a UE based communication system 1700. 1702 is a component for receiving subband load metric information from adjacent cells. 1704 is a component for determining the source of adjacent subband load metrics (e.g. directly from the adjacent cell, from the serving cell through the backhaul channel). 1706 is a component for determining the loaded/not loaded state of the subband load metrics. Component 1708 is a component for reducing assigned transmit power spectral density for UE for which it has been determined that the assigned subband is loaded in an adjacent cell. Component 1710 maintains an assigned transmit power spectral density. Component 1712 serves as a data store.

It can be readily appreciated from the foregoing that by sub-dividing bandwidth into respective sub-bands a more granular tuning of UE power-level can be achieved as compared to conventional schemes. As a result, overall system resource utilization as well as inter-cell interference mitigation is facilitated.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates inter-cell interference mitigation, comprising:
    receiving, at a user equipment (UE), first information corresponding to an observed load on uplink for a plurality of subbands for at least one adjacent cell;
    determining, at the UE, a source of the first information; and
    determining, at the UE, control information to control transmit power of the UE wherein, the transmit power of the UE is controlled based at least on the determination of the source of the first information and whether the first information indicates a corresponding subband at the at least one adjacent cell is loaded.

2. The method of claim 1, further comprising:
    determining second information corresponding to the observed load on uplink for the plurality of subbands; and
    providing the second information to the at least one adjacent cell, wherein the at least one adjacent cell uses the second information to control transmit power of UEs in the at least one adjacent cell.

3. The method of claim 2, wherein the providing the second information comprises sending the second information to the at least one adjacent cell, or broadcasting the second information to the UEs in the at least one adjacent cell, or both.

4. The method of claim 1, further comprising:
    determining if a first subband of the plurality of subbands at a first cell assigned to a UE in the first cell corresponds to a subband of the plurality of subbands at the at least one adjacent cell that is loaded based on the first information,
    wherein the control information reduces transmit power of the UE for the first subband when the first subband corresponds to a subband at the at least one adjacent cell that is loaded in the adjacent cell, and
    wherein the control information maintains or increases the transmit power of the UE for the first subband when the first subband corresponds to a subband at the at least one adjacent cell that is not loaded in the adjacent cell.

5. A method for facilitating inter-cell interference mitigation, the method comprising:
    determining control information to control transmit power of a user equipment (UE) for a subband among a plurality of subbands at the UE, the control information being determined based on first information corresponding to an observed load on uplink for a plurality of subbands at an adjacent cell, and wherein the control information is determined based on whether the first information indicates a corresponding subband at the adjacent cell is loaded and based on a determined source of the first information; and
    determining whether to adjust or maintain the transmit power of the UE based on the control information.

6. The method of claim 5, wherein the control information comprises a power command to reduce the transmit power of the UE if the subband is loaded in the at least one adjacent cell and to maintain or increase the transmit power of the UE if the subband is not loaded in the at least one adjacent cell.

7. A non-transitory computer readable storage medium, having stored thereon computer readable instructions for performing acts comprising:
- receiving, at a user equipment (UE), first information corresponding to an observed load on uplink for a plurality of subbands for at least one adjacent cell
- determining, at the UE, a source of the first information; and
- determining, at the UE, control information to control transmit power of the UE wherein, the transmit power of the UE is controlled based at least on the determination of the source of the first information and whether the first information indicates a corresponding subband at the at least one adjacent cell is loaded based on the first information.

8. The non-transitory computer readable storage medium of claim 7, having stored thereon computer readable instructions for performing acts comprising:
- determining second information corresponding to the observed load on uplink for the plurality of subbands; and
- providing the second information to the at least one adjacent cell, wherein the at least one adjacent cell uses the second information to control transmit power of UEs in the at least one adjacent cell.

9. The non-transitory computer readable storage medium of claim 8, having stored thereon computer readable instructions for sending the second information to the at least one adjacent cell, or broadcasting the second information to the UEs in the at least one adjacent cell, or both.

10. The non-transitory computer readable storage medium of claim 7, having stored thereon computer readable instructions for performing acts comprising:
- determining if a first subband of the plurality of subbands at a first cell assigned to a UE in the first cell corresponds to a subband of the plurality of subbands at the at least one adjacent cell that is loaded based on the first information,
- wherein the control information reduces transmit power of the UE for the first subband when the first subband corresponds to a subband at the at least one adjacent cell that is loaded in the adjacent cell, and
- wherein the control information maintains or increases the transmit power of the UE for the first subband when the first subband corresponds to a subband at the at least one adjacent cell that is not loaded in the adjacent cell.

11. A non-transitory computer readable storage medium, having stored thereon computer readable instructions for performing acts comprising:
- determining control information to control transmit power of a user equipment (UE) for a subband among a plurality of subbands at the UE, the control information being determined based on first information corresponding to an observed load on uplink for a plurality of subbands at an adjacent cell, and wherein the control information is determined based on whether the first information indicates a corresponding subband at the adjacent cell is loaded and based on a determined source of the first information; and
- determining whether to adjust or maintain the transmit power of the UE based on the control information.

12. The non-transitory computer readable storage medium of claim 11, wherein the control information comprises a power command to reduce the transmit power of the UE if the subband is loaded in the at least one adjacent cell and to maintain or increase the transmit power of the UE if the subband is not loaded in the at least one adjacent cell.

13. A processor that executes code for performing acts comprising:
- receiving, at a user equipment (UE), first information corresponding to an observed load on uplink for a plurality of subbands for at least one adjacent cell;
- determining, at the UE, a source of the first information; and
- determining, at the UE, control information to control transmit power of the UE wherein, the transmit power of the UE is controlled based at least on the determination of the source of the first information and whether the first information indicates a corresponding subband at the at least one adjacent cell is loaded.

14. The processor of claim 13 that executes code for performing acts comprising:
- determining second information corresponding to the observed load on uplink for the plurality of subbands; and
- providing the second information to the at least one adjacent cell, wherein the at least one adjacent cell uses the second information to control transmit power of UEs in the at least one adjacent cell.

15. The processor of claim 14 that executes code for sending the second information to the at least one adjacent cell, or broadcasting the second information to the UEs in the at least one adjacent cell, or both.

16. The processor of claim 13 that executes code for performing acts comprising:
- determining if a first subband of the plurality of subbands at a first cell assigned to a UE in the first cell corresponds to a subband of the plurality of subbands at the at least one adjacent cell that is loaded based on the first information,
- wherein the control information reduces transmit power of the UE for the first subband when the first subband corresponds to a subband at the at least one adjacent cell that is loaded in the adjacent cell, and
- wherein the control information maintains or increases the transmit power of the UE for the first subband when the first subband corresponds to a subband at the at least one adjacent cell that is not loaded in the adjacent cell.

17. A processor that executes code for performing acts comprising:
- determining control information to control transmit power of a user equipment (UE) for a subband among a plurality of subbands at the UE, the control information being determined based on first information corresponding to an observed load on uplink for a plurality of subbands at an adjacent cell, and wherein the control information is determined based on whether the first information indicates a corresponding subband at the adjacent cell is loaded and based on a determined source of the first information; and
- determining whether to adjust or maintain the transmit power of the UE based on the control information.

18. The processor of claim 17, wherein the control information comprises a power command to reduce the transmit power of the UE if the subband is loaded in the at least one adjacent cell and to maintain or increase the transmit power of the UE if the subband is not loaded in the at least one adjacent cell.

19. An apparatus for facilitating inter-cell interference mitigation, comprising:
- a storage medium, comprising computer executable instructions stored thereon for carrying out the following acts:

receiving, at a user equipment (UE), first information corresponding to an observed load on uplink for a plurality of subbands for at least one adjacent cell;

determining, at the UE, a source of the first information; and determining, at the UE, control information to control transmit power of the UE wherein, the transmit power of the UE is controlled based at least on the determination of the source of the first information and whether the first information indicates a corresponding subband at the at least one adjacent cell is loaded; and a processor that executes the computer executable instructions.

20. The apparatus of claim 19, the storage medium having stored thereon computer readable instructions for:

determining a second information corresponding to the observed load on uplink for the plurality of subbands, and providing the second information to at least one adjacent cell, wherein the at least one adjacent cell uses the second information to control transmit power of UEs in the at least one adjacent cell.

21. The apparatus of claim 20, the storage medium having stored thereon computer readable instructions for sending the second information to the at least one adjacent cell, or broadcasting the second information to the UEs in the at least one adjacent cell, or both.

22. The apparatus of claim 19, the storage medium having stored thereon computer readable instructions for performing acts comprising:

determining if a first subband of the plurality of subbands at a first cell assigned to a UE in the first cell corresponds to a subband of the plurality of subbands at the at least one adjacent cell that is loaded based on the first information, wherein the control information reduces transmit power of the UE for the first subband when the first subband corresponds to a subband at the at least one adjacent cell that is loaded in the adjacent cell, and wherein the control information maintains or increases the transmit power of the UE for the first subband when the first subband corresponds to a subband at the at least one adjacent cell that is not loaded in the adjacent cell.

23. An apparatus for facilitating inter-cell interference mitigation, comprising:

a storage medium, comprising computer executable instructions stored thereon for carrying out the following acts:

determining control information to control transmit power of a user equipment (UE) for a subband among a plurality of subbands at the UE, the control information being determined based on first information corresponding to an observed load on uplink for a plurality of subbands at an adjacent cell, and wherein the control information is determined based on whether the first information indicates a corresponding subband at the adjacent cell is loaded and based on a determined source of the first information; and determining whether to adjust or maintain the transmit power of the UE based on the control information; and a processor that executes the computer executable instructions.

24. The apparatus of claim 23, the storage medium having stored thereon computer readable instructions for receiving the control information comprising a power command to reduce the transmit power of the UE if the subband is loaded in the at least one adjacent cell and to maintain or increase the transmit power of the UE if the subband is not loaded in the at least one adjacent cell.

25. An apparatus that facilitates inter-cell interference mitigation, comprising:

means for receiving, at a user equipment (UE), first information corresponding to an observed load on uplink for a plurality of subbands for at least one adjacent cell;

means for determining, at the UE, a source of the first information; and means for determining, at the UE, control information to control transmit power of the UE wherein, the transmit power of the UE is controlled based at least on the determination of the source of the first information and whether the first information indicates a corresponding subband at the at least one adjacent cell is loaded.

26. The apparatus of claim 25, further comprising:

means for determining second information corresponding to the observed load on uplink for the plurality of subbands; and means for providing the second information to at least one adjacent cell, wherein the at least one adjacent cell uses the second information to control transmit power of UEs in the at least one adjacent cell.

27. The apparatus of claim 26, wherein the means for providing the second information comprises means for sending the second information to the at least one adjacent cell, or means for broadcasting the second information to the UEs in the at least one adjacent cell, or both.

28. The apparatus of claim 25, further comprising:

means for determining if a first subband of the plurality of subbands at a first cell assigned to a UE in the first cell corresponds to a subband of the plurality of subbands at the at least one adjacent cell that is loaded based on the first information, wherein the control information reduces transmit power of the UE for the first subband when the first subband corresponds to a subband at the at least one adjacent cell that is loaded in the adjacent cell, and wherein the control information maintains or increases the transmit power of the UE for the first subband when the first subband corresponds to a subband at the at least one adjacent cell that is not loaded in the adjacent cell.

29. An apparatus that facilitates inter-cell interference mitigation, comprising:

means for determining control information to control transmit power of a user equipment (UE) for a subband among a plurality of subbands at the UE, the control information being determined based on first information corresponding to an observed load on uplink for a plurality of subbands at an adjacent cell, and wherein the control information is determined based on whether the first information indicates a corresponding subband at the adjacent cell is loaded and based on a determined source of the first information; and means for determining whether to adjust or maintain the transmit power of the UE based on the control information.

30. The apparatus of claim 29, wherein the control information comprises a power command to reduce the transmit power of the UE if the subband is loaded in the at least one adjacent cell and to maintain or increase the transmit power of the UE if the subband is not loaded in the at least one adjacent cell.

* * * * *